(12) United States Patent
Bright

(10) Patent No.: US 8,330,306 B2
(45) Date of Patent: Dec. 11, 2012

(54) MAGNETOPLASMADYNAMIC (MPD) GENERATOR

(75) Inventor: Christopher G. Bright, Nottingham (GB)

(73) Assignee: Rolls-Royce PLC, London (GB)

(*) Notice: Subject to any disclaimer, the term of this patent is extended or adjusted under 35 U.S.C. 154(b) by 261 days.

(21) Appl. No.: 12/717,329

(22) Filed: Mar. 4, 2010

(65) Prior Publication Data

US 2010/0237715 A1    Sep. 23, 2010

(30) Foreign Application Priority Data

Mar. 23, 2009 (GB) .................................. 0904851.3

(51) Int. Cl.
G21D 7/02 (2006.01)
H02K 44/00 (2006.01)
H01R 39/00 (2006.01)
(52) U.S. Cl. ............. 310/11; 310/219; 219/71; 313/328
(58) Field of Classification Search .................... 310/11, 310/219; 219/71; 313/328
See application file for complete search history.

(56) References Cited

U.S. PATENT DOCUMENTS

| | | | | |
|---|---|---|---|---|
| 2,716,943 A * | 9/1955 | Vandenberg | .................... | 417/50 |
| 3,160,768 A * | 12/1964 | Goeschel et al. | .............. | 310/11 |
| 3,219,852 A * | 11/1965 | Brill | ................. | 310/11 |
| 3,271,603 A * | 9/1966 | Wiedemann | .................. | 310/219 |
| 3,275,860 A * | 9/1966 | Way | ................. | 310/11 |
| 3,355,604 A * | 11/1967 | Klein et al. | .................... | 310/11 |
| 3,397,331 A * | 8/1968 | Burkhard | ........................ | 310/11 |
| 3,414,745 A * | 12/1968 | Bidard | ............................ | 310/11 |
| 3,443,129 A * | 5/1969 | Hammitt | ........................ | 310/11 |
| 3,453,461 A * | 7/1969 | Engel | ............................... | 310/11 |
| 3,453,462 A * | 7/1969 | Dunning, Jr. et al. | ........... | 310/11 |
| 3,582,976 A * | 6/1971 | de Simone et al. | ............. | 310/11 |
| 3,614,489 A | 10/1971 | Jensen et al. | | |
| 3,746,896 A * | 7/1973 | Gruner | ............................ | 310/11 |
| 3,854,061 A * | 12/1974 | Rosa | ................................ | 310/11 |
| 3,940,641 A * | 2/1976 | Dooley | ........................... | 310/11 |
| 3,999,089 A * | 12/1976 | Barros | ............................ | 310/11 |
| 4,800,727 A * | 1/1989 | Petrick | .............................. | 60/649 |
| 4,906,877 A * | 3/1990 | Ciaio | ................................ | 310/11 |
| 5,473,205 A * | 12/1995 | Haaland | ......................... | 310/11 |
| 5,637,934 A * | 6/1997 | Fabris | ............................ | 310/11 |
| 5,685,966 A * | 11/1997 | Aaron et al. | .................. | 204/600 |
| 6,029,453 A * | 2/2000 | Mendive | ...................... | 60/641.2 |

(Continued)

FOREIGN PATENT DOCUMENTS

GB    1038314    8/1966

(Continued)

OTHER PUBLICATIONS

Rietjens; "The Future for MHD Power Generation;" *Phys. Technol.*; 1979; pp. 216-221; vol. 10; The Institute of Physics; Great Britain.

(Continued)

*Primary Examiner* — Quyen Leung
*Assistant Examiner* — Alex W Mok
(74) *Attorney, Agent, or Firm* — Oliff & Berridge, PLC

(57) ABSTRACT

A magneto-plasma-dynamic (MPD) generator, comprising: a conveying duct shaped for conveying a high velocity, conductive fluid; a magnetic field generator arranged to generate a magnetic field across the conveying duct, substantially perpendicular to the direction of travel of the fluid, such that the fluid passes through the magnetic field (2) when conveyed by the duct; electrodes provided in the conveying duct to conduct a current induced in the fluid as it is conveyed by the conveying duct through the magnetic field; and an electrode supplying mechanism configured to supply a conductive liquid for replenishing the electrodes.

14 Claims, 25 Drawing Sheets

U.S. PATENT DOCUMENTS

| | | | |
|---|---|---|---|
| 6,846,467 B1 * | 1/2005 | Predtechensky | 422/186.21 |
| 6,982,501 B1 * | 1/2006 | Kotha et al. | 310/11 |
| 2007/0274840 A1 * | 11/2007 | Ehben et al. | 417/50 |

FOREIGN PATENT DOCUMENTS

| | | |
|---|---|---|
| GB | 1 203 241 | 8/1970 |
| GB | 1 214 116 | 12/1970 |
| GB | 1 505 758 | 3/1978 |

OTHER PUBLICATIONS

Stangeby; "A Review of the Status of MHD Power Generation Technology Including Suggestions for a Canadian MHD Research Program;" Institute for Aerospace Studies; Nov. 1974; UTIAS Review No. 39; University of Toronto.

British Search Report conducted on Jul. 28, 2009 in corresponding British Patent Application No. 0904851.3.

* cited by examiner

MAGNETOPLASMADYNAMIC (MPD) GENERATOR

The present invention relates to magneto-plasma-dynamic (MPD) generators and to operating such MPD generators.

MPD generators are in general known. They are sometimes referred to as magneto-hydro-dynamics (MHD) generators, despite the fact that they can be applied to the flow of gases and plasma in addition to the flow of liquids. The more correct term MPD will be used hereafter.

Three general types of MPD generators are known. These are the Faraday MPD generator, the Hall effect MPD generator and the disc MPD generator. A schematic of a Faraday MPD generator is shown in FIG. 1. In use, a high velocity ionised gas 1 is conveyed in a duct through a magnetic field 2, generated by a magnet or magnets having poles S and N, perpendicular to the velocity. A voltage 3 is developed perpendicular to the magnetic field 2 and velocity according to Fleming's right hand rule. Current 5 is collected by positive and negative MPD electrodes 4 labelled + and − respectively, such as rods of carbon or tungsten. The current can be applied to an electrical load.

The Hall effect MPD generator and the disc MPD generator apply the same principle as the Faraday MPD generator, but have somewhat different structures.

After generation of MPD power, the exhaust gas is hot enough and fast enough to be used in other processes, typically to raise steam for conventional turbogenerators. MPD generation is therefore regarded as a "topping cycle" which increases the thermal efficiency of electric power generation by using the temperature difference between the temperature of combustion and the temperature that most engineering materials can withstand. In other words, MPD generators can be used to extract useful energy from exhaust gas, for example in an electricity generating plant. MPD/MHD is a widely known principle, but has met with limited commercial success. For example, the UK Central Electricity Generating Board did extensive work on MPD but with no commercial success. Reference material on MPD power generation includes:

[1]. The future for MHD power generation L. H. T. Rietjens 1979 *Physics in Technology* 10 216-21.
[2]. Stangeby (1974): A review of the status of MHD power generation technology including suggestions for a Canadian MHD research programme, Institute for Aerospace Studies, University of Toronto, UTIAS Review No. 39.

In addition, the use of an MHD generator for generating radio frequency energy is disclosed in U.S. Pat. No. 3,243,713.

Known MPD generators suffer from erosion of the electrodes due to the fast flowing stream of gas used, which may contain abrasive particles such as fuel ash depending on how the hot gas is obtained, and due to the high temperatures. Replacement of the solid electrodes therefore becomes necessary.

According to a first aspect of the invention, there is provided a magnetoplasmadynamic (MPD) generator, comprising: a conveying duct shaped for conveying a high velocity, conductive fluid; a magnetic field generator arranged to generate a magnetic field across the conveying duct, substantially perpendicular to the direction of travel of the fluid, such that the fluid passes through the magnetic field when conveyed by the duct; electrodes provided in the conveying duct to conduct a current induced in the fluid as it is conveyed by the conveying duct through the magnetic field; and an electrode supplying mechanism configured to supply a liquid metal, such as lithium, sodium or potassium, or a molten salt for use as the electrodes, wherein the electrode supplying mechanism include a pumping means for varying the height of the liquid metal or molten salt electrodes in the duct. In this way, control over the operation of the MPD generator can be enhanced. Use of a liquid metal or molten metal salt has the further advantage of 'seeding' the fluid in the duct with conductive metal ions so as to enhance the electrical conductivity of the fluid. It should be noted that the term 'fluid' as used herein includes a liquid, gas or plasma.

The conveying duct may comprise a channel provided in a lower region of the conveying duct, the liquid metal electrodes or molten salt electrodes are arranged in wells at the bottom of the channel and the channel has a sloping base region between the liquid metal or molten salt electrodes.

Further, the MPD generator may include a repelling device for generating a magnetic field that repels the induced current in the fluid away from an inner surface of the duct. In this way, wear on the inner surfaces of the duct can be reduced. A suitable repelling device may be a repelling circuit arranged to have a current flowing in the opposite direction to the flow of the induced current in the fluid, so as to thereby repel the induced current away from the inner surface of the duct.

Alternatively, the electrode supplying mechanism may be arranged to supply the liquid metal or molten salt through apertures in side walls of the duct, the apertures being distanced from base and top walls of the duct. In this way also, the induced current is kept away from the inner surfaces of the base and top walls of the duct.

The repelling device maybe arranged beneath the sloping base region of the conveying duct.

The repelling circuit may comprise a first variable impedance connected to an anode electrode and a positive terminal, a first conductor is arranged beneath the sloping base region of the conveying duct, the first conductor is connected to the anode electrode and is connected to the positive terminal via a second variable impedance, a third variable impedance is connected to a cathode electrode and a negative terminal, a second conductor is arranged beneath the sloping base of the conveying duct, the second conductor is connected to the cathode electrode and is connected to the negative terminal via a variable impedance.

Preferably, the electrode supplying mechanism includes a flow electrical isolator configured to prevent an electrically conductive path forming in the flow of liquid metal or molten salt for use as the liquid electrodes. The flow electrical isolator may be a gravity flow or inverse gravity flow electrical isolator, or may be a pumped flow or inverted pumped flow electrical isolator.

In one embodiment the electrodes, anode and cathode, are linked by a conduit and a liquid metal outlet is provided from the conduit in the vicinity of the cathode. This embodiment may be used for metal smelting by supplying, using the electrode supplying mechanism, a molten metal salt as the anode and the cathode.

In another embodiment, the electrode supplying mechanism includes an input pipe into which a liquid metal can be fed, a cooling means for cooling the liquid metal, and an extrusion screw for extruding the metal so as to feed extruded solid metal into the duct for use as a said electrode. In this way, liquid metal is used to conveniently replenish solid metal electrodes.

The MPD generator may further include a condenser arranged to receive the gas from the conveying duct after it has passed through the magnetic field so as to condense any liquid metal or molten salt contained in the exhaust gas.

According to a second aspect, there is provided an electricity generating system comprising an MPD generator according to the first aspect and an electricity generator which generates hot gas, wherein the MPD generator and the electricity generator are arranged to operate in a closed cycle.

The electricity generator may be a gas-cooled nuclear reactor, the hot gas produced by the reactor being the coolant gas. Further, the gas-cooled nuclear reactor and the MPD generator may be housed within a pressure vessel, for example as in the case of a modular helium reactor. The use of replenishable liquid electrodes supplied by an electrode supplying mechanism is particularly advantageous for such a use.

Thus, as an embodiment of the second aspect, there may be provided an electricity generating system comprising: a pressure vessel; an MPD generator according to the first aspect and a gas-cooled nuclear reactor both housed within the pressure vessel, wherein the MPD generator and the gas-cooled nuclear reactor are arranged to operate in a closed cycle using the hot gas generated by the nuclear reactor. Preferably, the system further includes one or more electrode condenser heat exchangers for recycling the conductive liquid (e.g. liquid metal or molten salt) from the exhaust gas of the MPD generator. A reservoir for the conductive liquid may be provided also.

Alternatively in the second aspect, the electricity generator may be a geothermal generator or a solar generator used to heat gas.

According to a third aspect, there is provided a method of starting a generator according to the first aspect, the method comprising: using the pumping means to adjust the height of the liquid metal or molten salt in the duct so that the liquid electrodes touch; passing a large starting current between the electrodes; reducing the height of the liquid metal or molten salt so as to separate the electrodes; and initiating the magnetic field and the flow of fluid through the conveying duct.

Reference is now made, by way of example only, to the accompanying drawings, in which.

Figure 2:
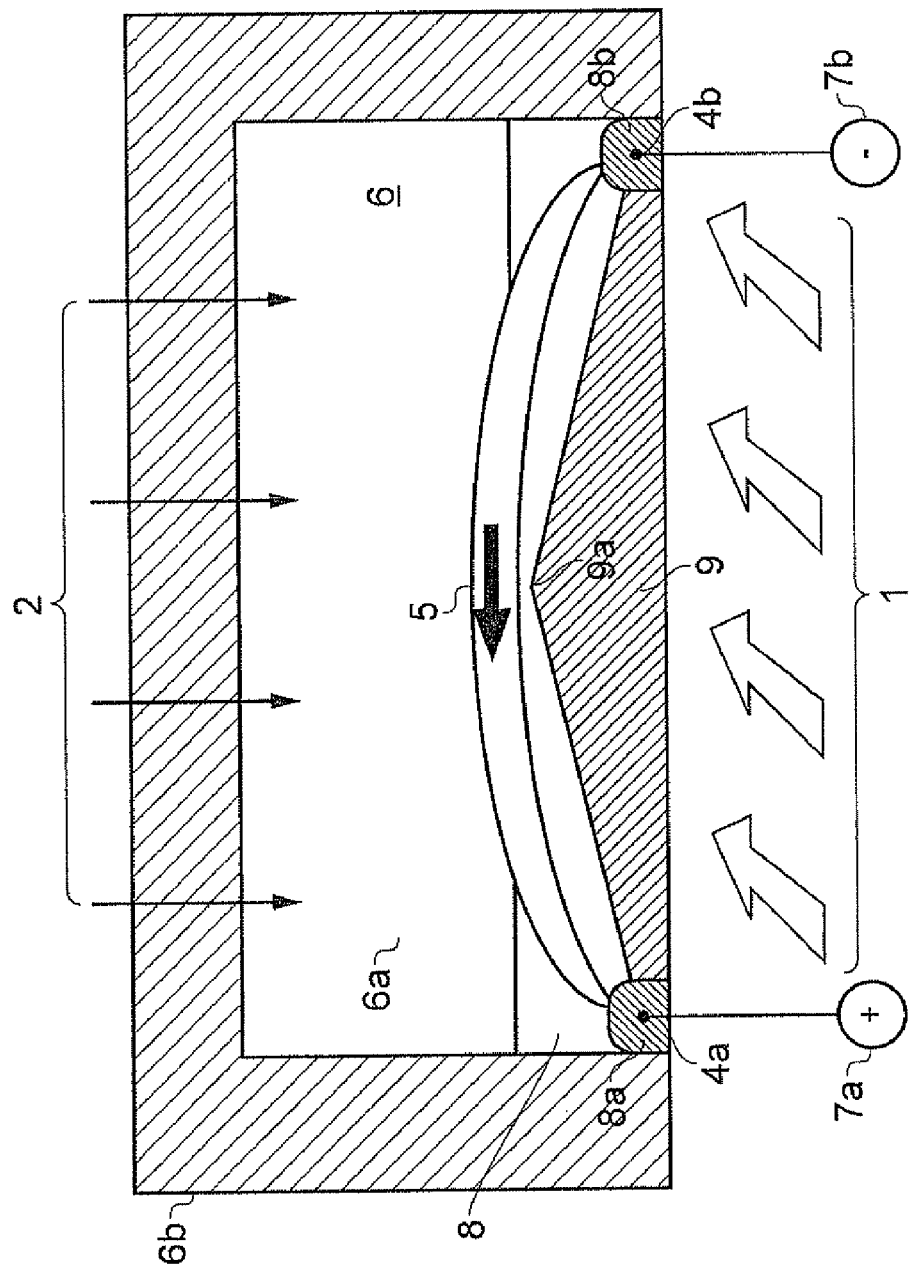
FIG. 2 shows a cross-section of an MPD duct having liquid metal electrodes provided therein.
Figure 3:
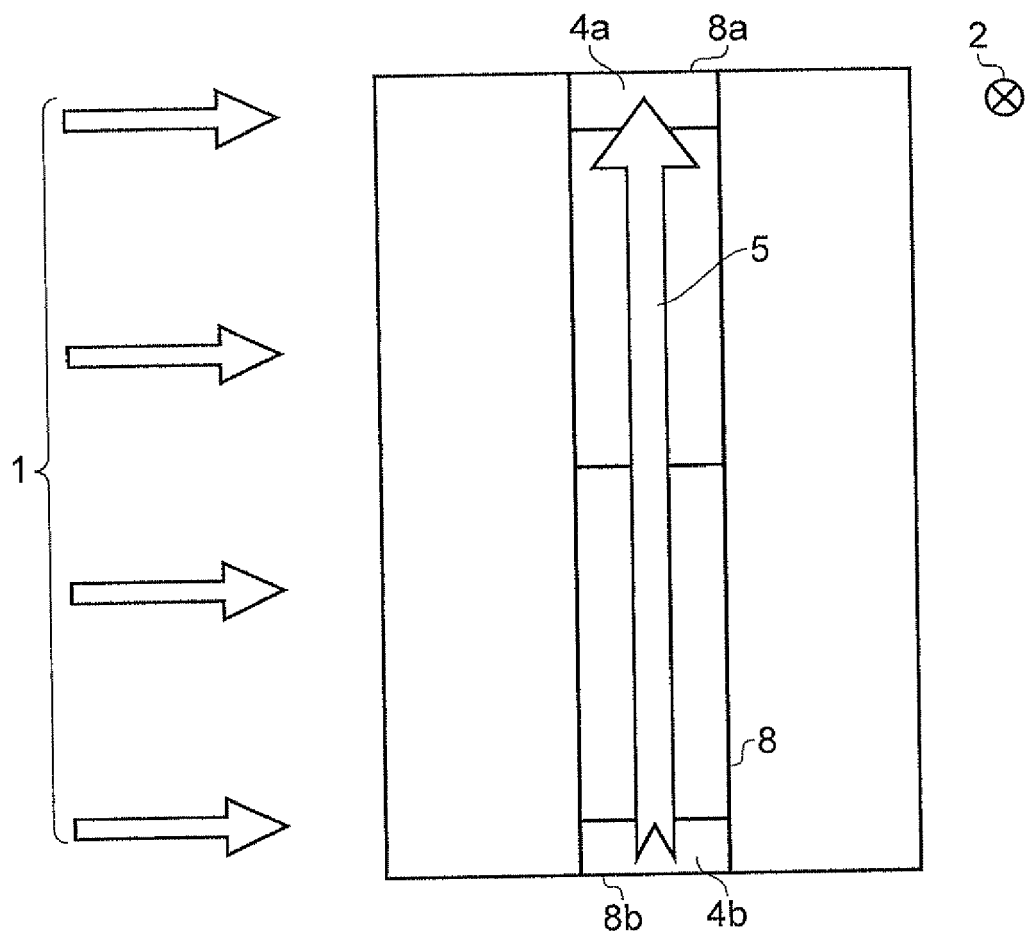
FIG. 3 shows a plan view of the lower surface of the MPD duct of FIG. 2.
Figure 4:
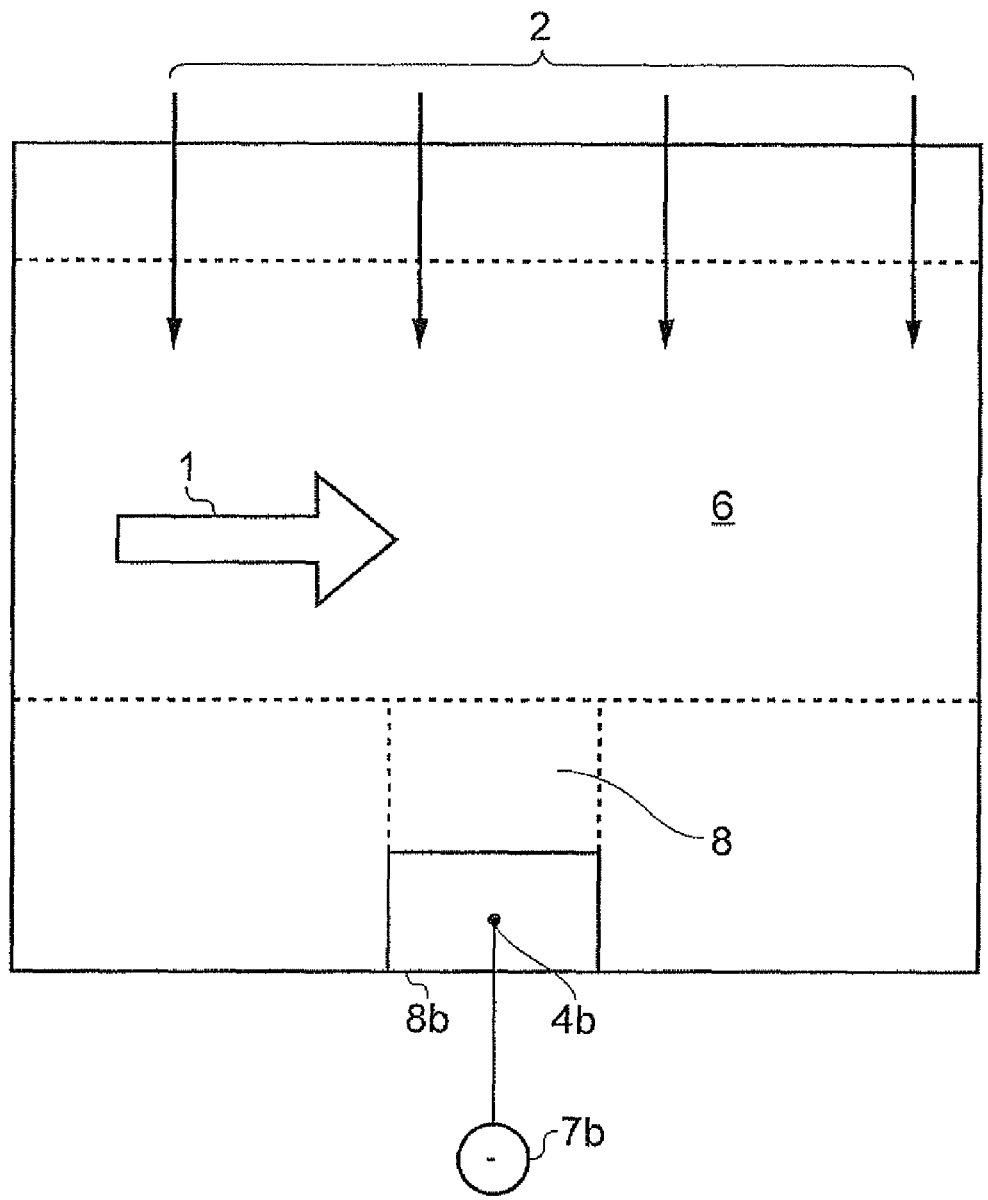
FIG. 4 shows a side view of the MPD duct of FIG. 2.

FIG. 2 shows a cross-section of an MPD duct 6 having liquid metal electrodes 4a, 4b provided therein. FIG. 3 shows a plan view of the lower surface of the MPD duct of FIG. 2. FIG. 4 shows a side view of the MPD duct of FIG. 2. The MPD duct 6 comprises an opening 6a housed within an electrically insulating refractory material 6b, such as fused silica, fused alumina, fireclay or concrete. A channel 8 is provided in a lower region of the MPD duct 6, and liquid metal electrodes 4 (anode 4a, cathode 4b) are provided in openings in a base portion of the duct 6. In other words, the liquid metal electrodes are set in wells 8a, 8b at the bottom of the channel 8. A sloping base region 9 is provided between the liquid metal electrodes. The sloping base region 9 slopes upwardly from each of the wells 8a, 8b towards an apex 9a positioned between the wells 8a, 8b. Electrical connections are made to each electrode, shown in the form of terminals 7a, 7b connected to the liquid metal electrodes 4a, 4b. An electrode supplying mechanism supplies liquid metal to the electrodes 4a, 4b to make good the loss caused by evaporation and erosion.

Figure 1:
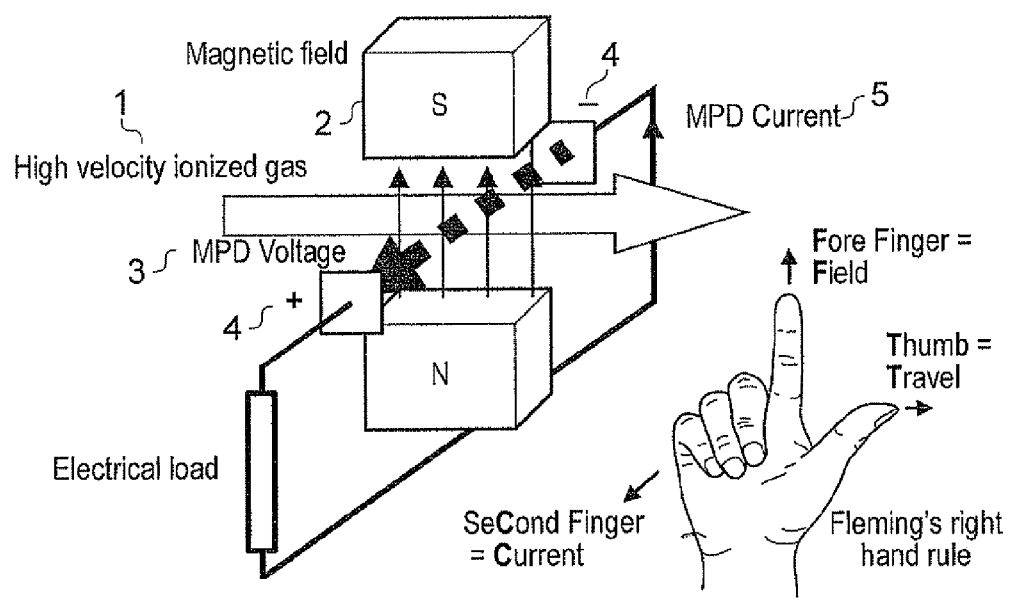
FIG. 1 shows a schematic of a Faraday MPD generator.

A magnetic field 2 is generated across the duct by a suitable magnet mechanism as known in the art, e.g. a magnet as shown in FIG. 1. In FIG. 2, the magnetic field 2 crosses the duct 6 in the vertical direction. A fast-flowing stream of gas 1 is arranged to flow along the duct, i.e. horizontally into the plane of the drawing in FIG. 2. The high velocity gas 1 and the magnetic field 2 are substantially perpendicular to one another.

In use, an MPD voltage is developed perpendicular to both the gas flow 1 and the magnetic field 2, that is, horizontally also in FIG. 2. This voltage passes an MPD current 5 between the liquid metal cathode 4b and anode 4a. The electrically insulating refractory material 6b prevents a short-circuit of the MPD voltage.

As the electrode supplying mechanism, various known designs of pumps may be used. However, it is important that supplying and pumping the liquid metal does not short-circuit the liquid metal electrodes unintentionally. Therefore, there must be no unintentional connections to earth via the pumps. This may be achieved by making the pump casing and moving parts such as impellers and pistons from electrically insulating materials.

Alternatively, it may be achieved by making the pump from metal but mounting the pump on electrical insulation. In such an arrangement, an electrically insulating mechanical coupling is provided to transfer mechanical power from the motor driving the pump to the pump itself.

Further, if the motor driving the pump is an electric motor, both the electric motor and the pump may be mounted on electrical insulation. The electric motor should be supplied via an isolating transformer.

Alternatively, a magneto-hydro-dynamic pump may be used. This is a linear induction motor with the liquid metal acting as the "rotor" in an induction motor. The liquid metal is contained within an insulated channel in the pump and the stator windings induce electric currents in the liquid metal producing force and a pumping action. An MHD pump offers good electrical isolation between earth, the electrical supply to the pump, and the liquid metal being pumped.

As an alternative to using a pump, the electrode supplying mechanism may supply the liquid metal to the electrodes under gravity.

It is also necessary to avoid unintentional connections to earth via valves, tanks and instrumentation. This may require valves and tanks to be made of electrically insulating materials or mounted on electrical insulation.

Instrumentation should also be designed to avoid unintentional connections to earth by using isolating transformers, optical measurements and non-contact measuring techniques such as inductive microwave and ultrasound sensing to measure quantities such as flow rates and levels.

Ideally, pipes are made of electrically insulating material. Otherwise pipes are mounted using insulated supports and are isolated from other metalwork using insulating glands, flanges and joints.

In the electrode supplying mechanism, the liquid metal has to be kept at temperatures well above ambient temperatures. This typically requires lagging various parts such as pipes, valves and pumps with thermal insulation. Happily, many thermal insulators are good electrical insulators so the thermal insulation may sometimes serve as electrical insulation also.

As the liquid metal for the electrodes, the alkali metals sodium, potassium and lithium are examples of liquid metals which may be used. Properties of these metals are shown in Table 1 below:

TABLE 1

Characteristics of some alkali metals

| Alkali metal | m.p. ° C. | b.p. ° C. | Density kg m$^{-3}$ |
| --- | --- | --- | --- |
| Lithium | 180.6 | 1360 | 533 |
| Sodium | 97.9 | 900 | 966 |
| Potassium | 63.2 | 770 | 862 |

Figure 5:
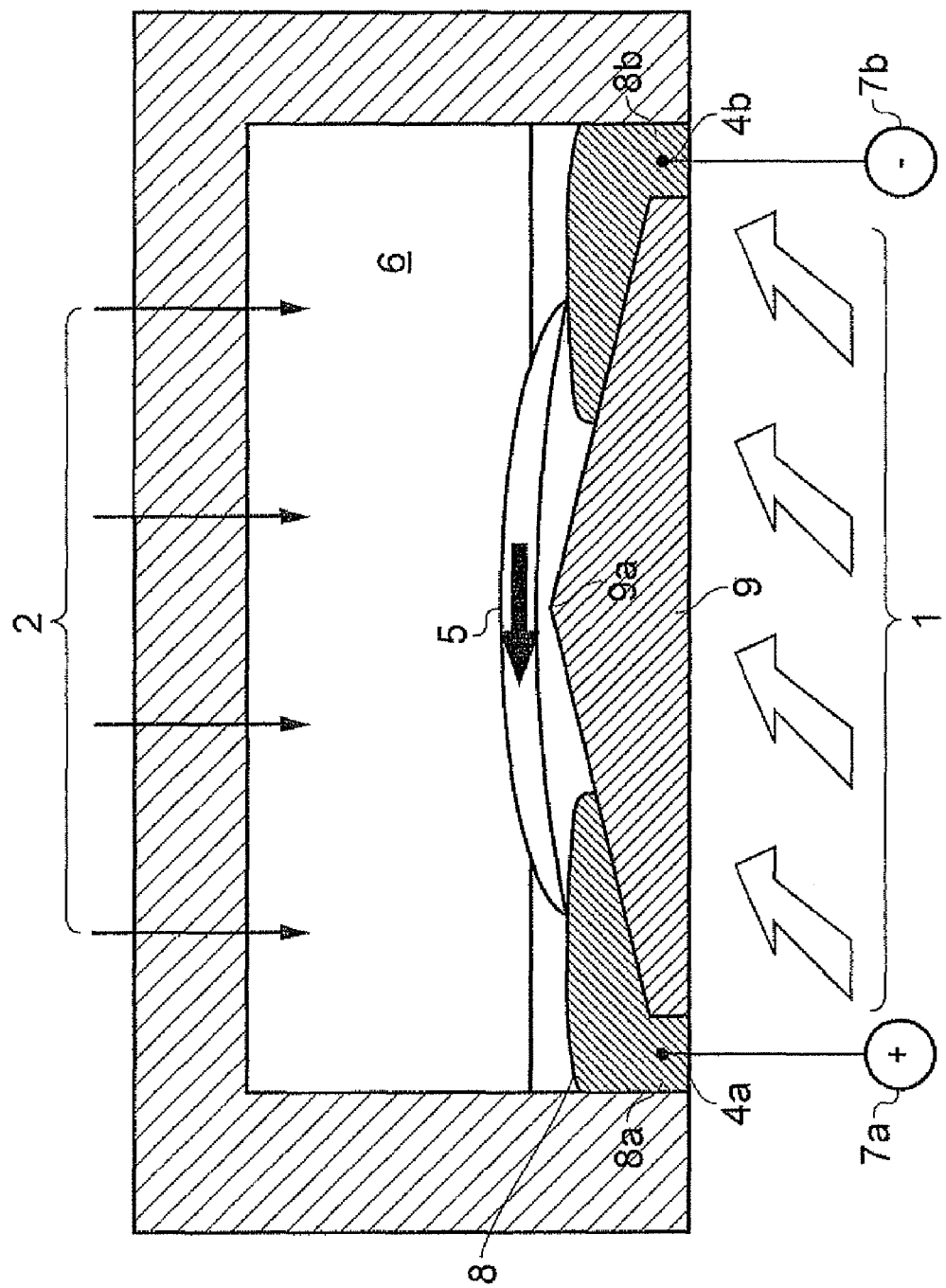
FIG. 5 shows the cross-section of the MPD duct, wherein the level (height) of the liquid metal electrodes has been increased.
Figure 6:
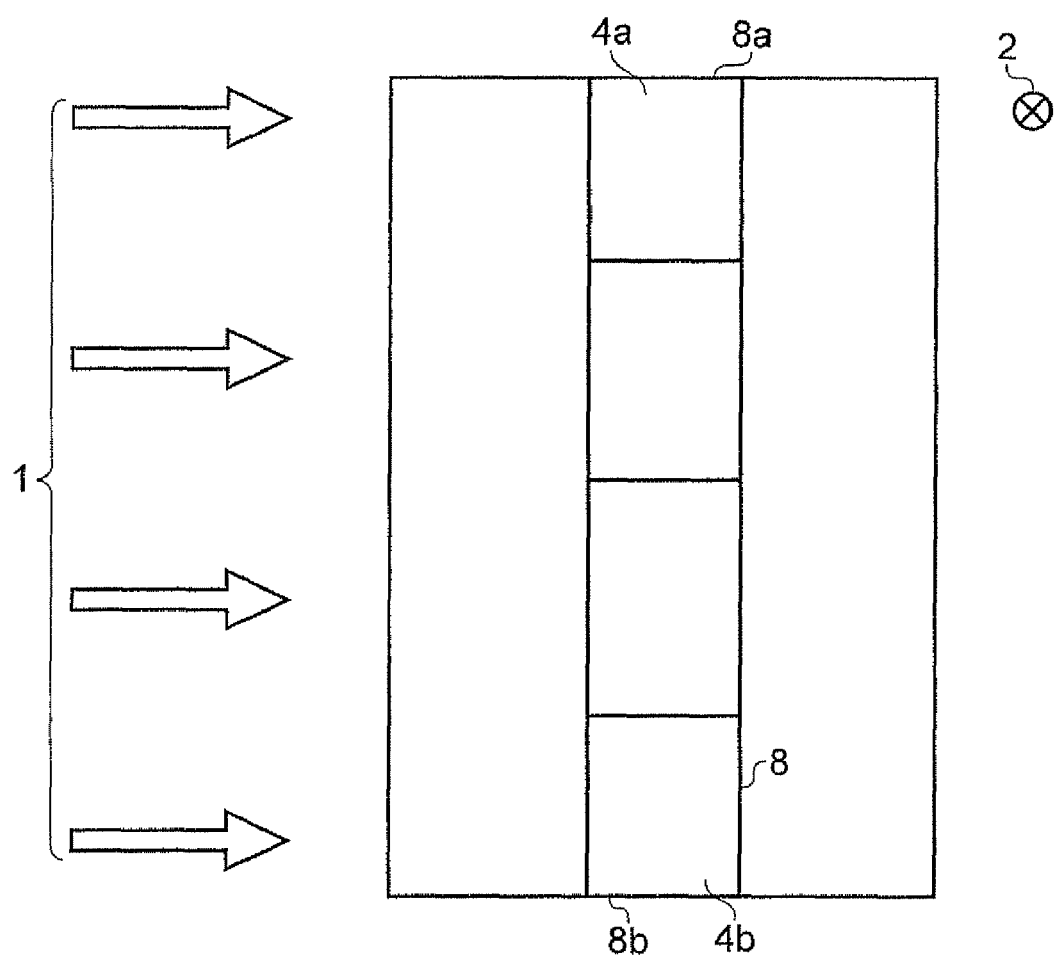
FIG. 6 shows a plan view of the MPD duct of FIG. 5.
Figure 7:
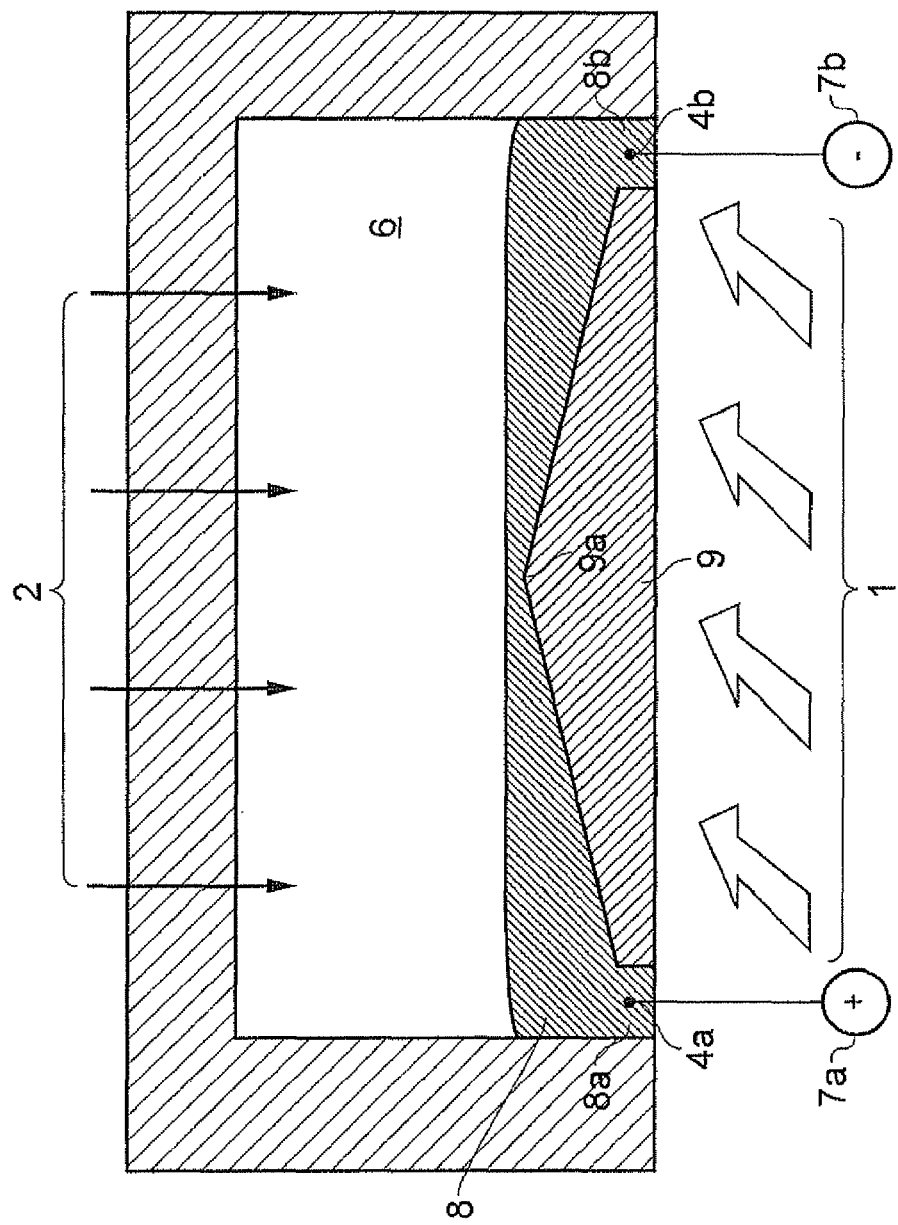
FIG. 7 shows the cross-section of the MPD duct, wherein the level of the liquid metal electrodes has been increased so that the electrodes touch.
Figure 8:
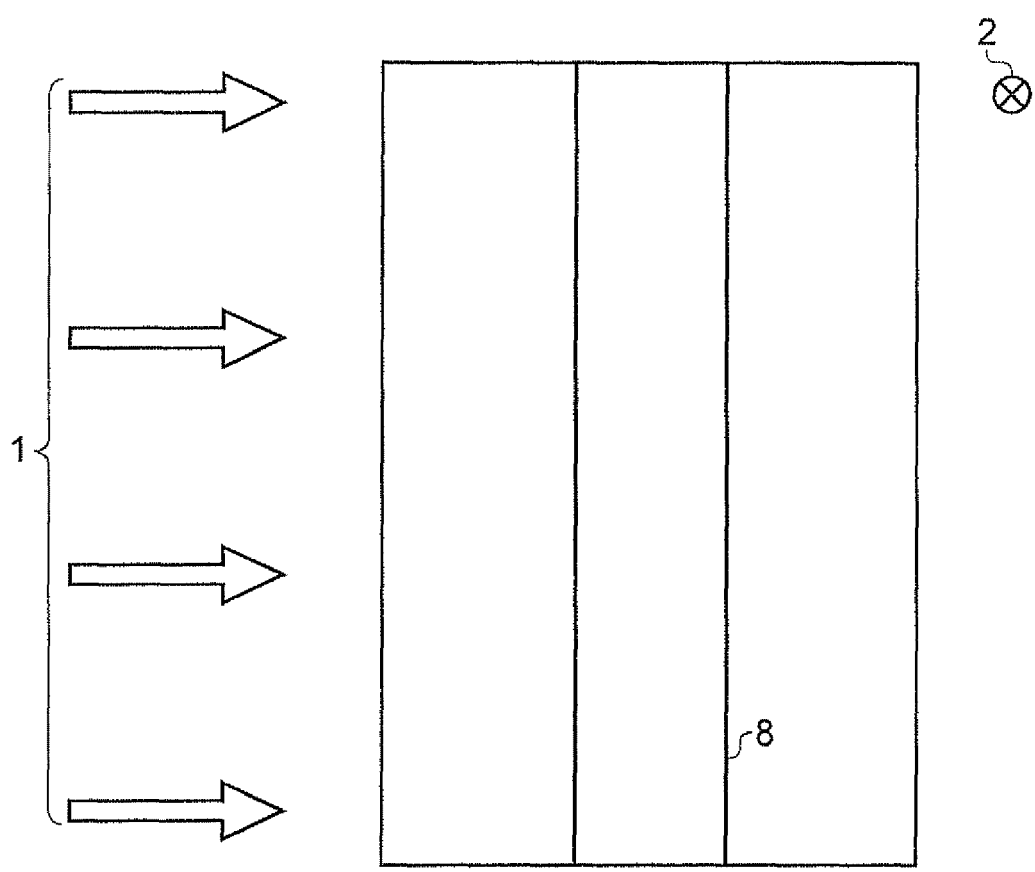
FIG. 8 shows a plan view of the MPD duct of FIG. 7.

As stated above, the electrode supplying mechanism may include one or more pumps. Preferably, these are operable for varying the level (height) of the liquid metal electrodes $4a$, $4b$ in the duct 6. FIG. 5 shows the cross-sectional view corresponding to FIG. 2, but wherein the level (height) of the liquid metal electrodes has been increased. FIG. 6 shows the plan view of the MPD duct 6 corresponding to FIG. 3, but with the increased height of the liquid metal electrodes as shown in FIG. 5. FIG. 7 shows the cross-sectional view corresponding to FIG. 2, but wherein the level of the liquid metal electrodes has been increased such that the liquid metal anode $4a$ and cathode $4b$ touch. FIG. 8 shows the plan view of the MPD duct 6 corresponding to FIG. 3, but with the touching liquid metal electrodes $4a$, $4b$ as shown in FIG. 7.

Varying the level of the liquid metal electrodes $4a$, $4b$ may be used to control the MPD generator. For example, it may be used to start the MPD generator using the following sequence:

1. The MPD duct magnetic field 2 and the MPD gas flow 1 are initially switched off.
2. The levels of the liquids in the electrodes $4a$, $4b$ are adjusted until the anode $4a$ and cathode $4b$ touch.
3. A large starting current is passed between the electrodes $4a$, $4b$ to initiate the MPD generator.
4. The levels of the liquids are reduced so that the electrodes $4a$, $4b$ separate as shown in FIGS. 4 and 5. The starting current flows across the gap between the electrodes $4a$, $4b$, establishing a strongly ionised path between the electrodes.
5. The MPD duct magnetic field 2 and the MPD gas flow 1 are switched on to develop an induced MPD voltage 3 which maintains a current 5 through the MPD duct 6. The starting current can then be turned off.

In the embodiment shown in FIGS. 2 and 5, there is a tendency for the MPD current 5 to flow in the opening $6a$ just above the base region (e.g. just above the sloping base region 9). There is risk of damage to the MPD duct if the MPD current 5 flows too close to an inner surface of the MPD duct 6, such as the base region 9. This is because of the heat liberated by the MPD current 5.

Figure 9:
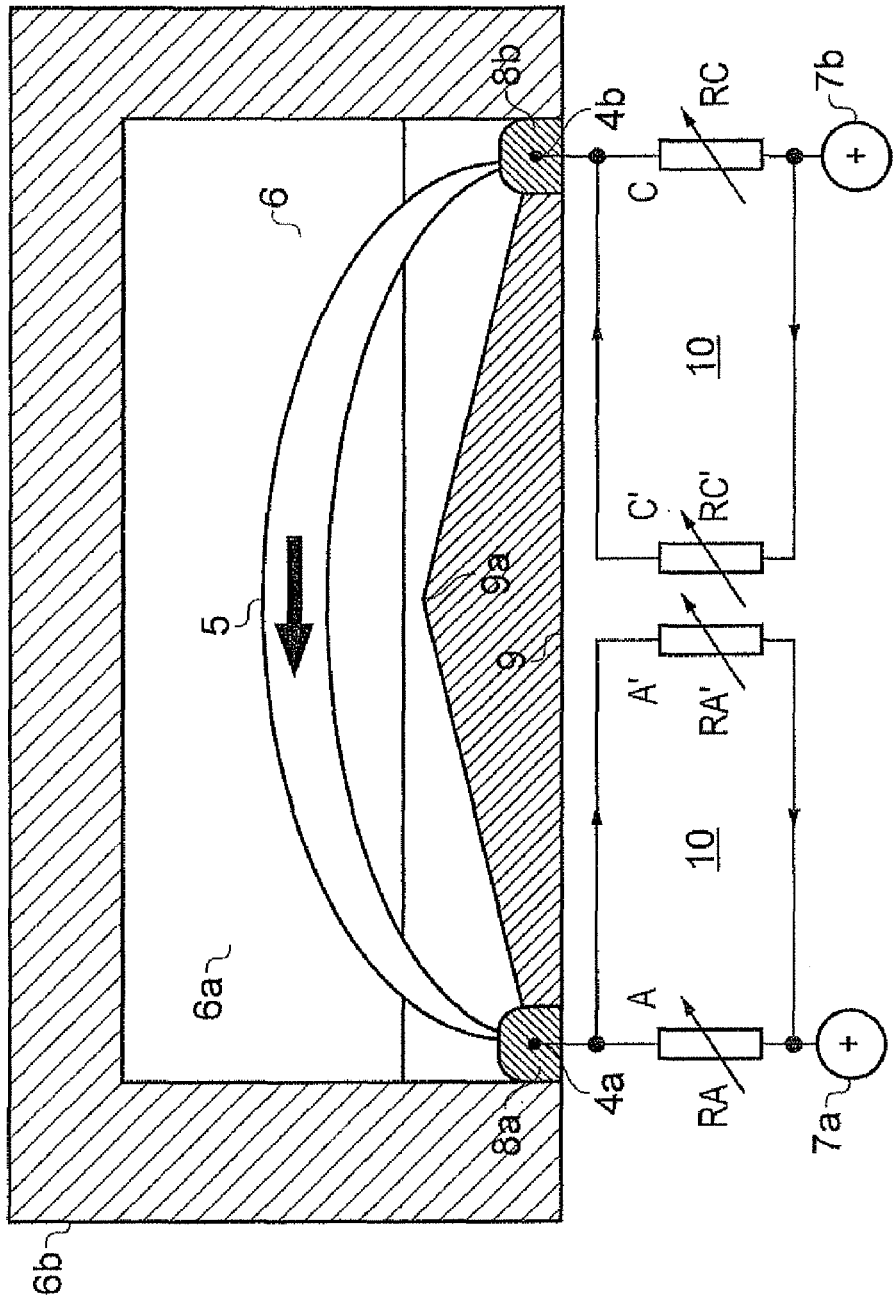
FIG. 9 shows a repelling circuit for magnetically repelling the induced MPD current away from the base of the duct.

In one embodiment of the invention, a repelling device (e.g. magnet) is provided to magnetically repel the MPD current 5 away from the base region of the duct 6. An example repelling circuit 10 acting as a repelling device is shown in FIG. 9.

Here, the required magnetic repulsion is achieved by routing the electrode connections along the base of the duct so as to establish a magnetic field that tends to repel the MPD current 5 away from the base of the duct 6.

Some current from the liquid metal anode $4a$ flows to the positive terminal $7a$ of the MPD generator via variable impedance RA. The remaining current from the liquid metal anode $4a$ is routed along a conductor A A' that runs just beneath the base of the MPD duct. This current flows through the variable impedance RA' to the positive terminal $7a$ of the MPD generator. The current through A A' produces a magnetic field that repels the MPD current 5 in the opening $6a$ of the duct 6 away from the base of the duct, according to the principle that currents flowing in opposite directions (so-called "unlike currents") repel.

The strength of the repulsion is controlled by controlling the current in A A' and this is achieved by varying the ratio of the impedances RA and RA'. Similar principles apply to RC, RC' and conductor C C' that are connected to the liquid metal cathode $4b$ and the negative terminal $7b$ of the MPD generator.

As an alternative circuit arrangement, impedances RC and RC' and conductor C C' may be omitted entirely and the repulsive force may be obtained instead by extending conductor AA' along the base of the MPD generator to a point close to the cathode $4b$. Likewise, impedances RA and RA' and conductor A A' may be omitted entirely and the repulsive force may be obtained instead by extending conductor CC' to a point close to the anode $4a$.

Figure 10:
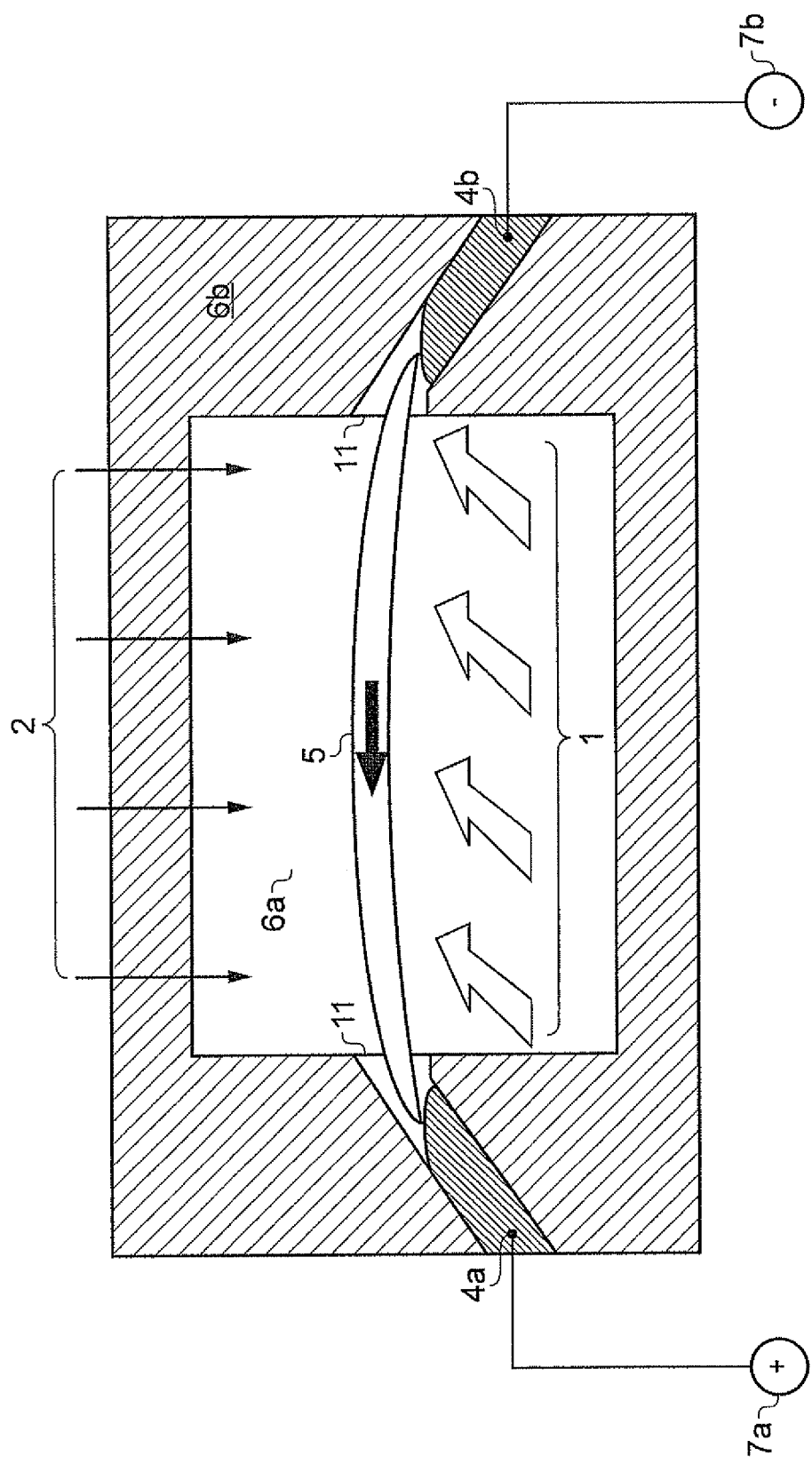
FIG. 10 shows a variant MPD duct structure, in which the liquid metal electrodes are provided through apertures in the side walls of the duct.

According to another embodiment, the liquid metal electrodes $4a$, $4b$ may be positioned such that they are spaced apart from the base region and top region of the duct opening $6a$. FIG. 10 shows a configuration in which the electrode supplying mechanism supplies the liquid metal to apertures 11 provided in the side walls of the electrically insulating refractory material $6b$ which houses the opening $6a$. Thus the liquid metal electrodes $4a$, $4b$ are provided in the side walls of the duct 6. In this way, the MPD current flow 5 is kept apart from the inner surfaces of the duct 6.

Figure 11:
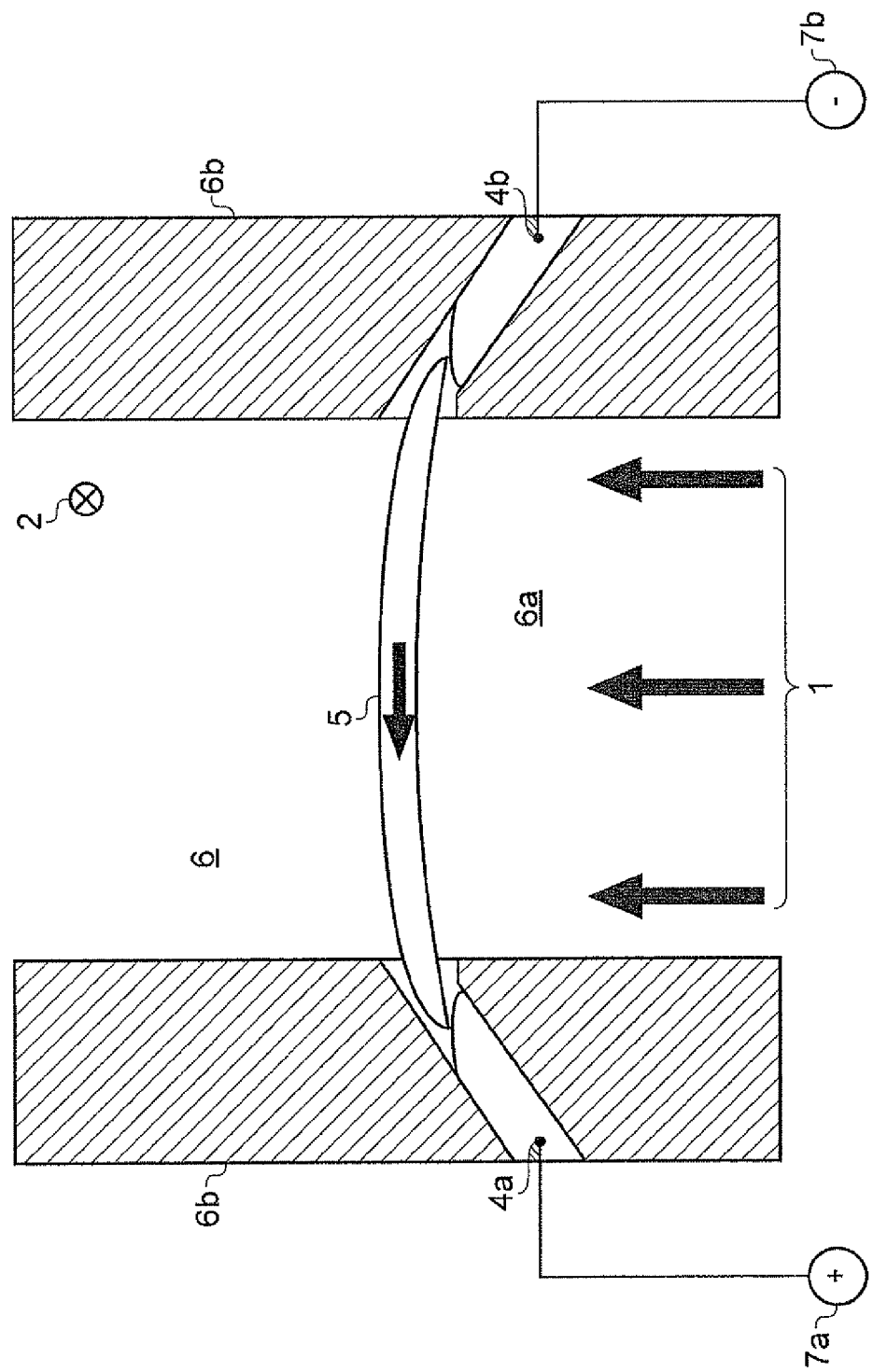
FIG. 11 shows the duct of FIG. 10 orientated such that the gas flows vertically.

Further, the use of liquid metal electrodes $4a$, $4b$ in the vertical walls of the MPD duct may be developed to allow orientations of the MPD duct that have a flow of gas in a direction different to the horizontal. FIG. 11 shows the duct of FIG. 10 orientated in space such that the gas flows vertically. In FIG. 11, the magnetic field 2 is into the plane of the drawing and the MPD current 5 flows between the liquid metal electrodes $4a$, $4b$ in a direction perpendicular to both the magnetic field 2 and the flow of gas 1. In both of FIGS. 10 and 11 the electrode supplying mechanism supplies a continuous supply of liquid metal to the electrodes.

As outlined above, the electrode supplying mechanism may include one or more pumps. It will also include a conduit, e.g. pipe, leading the liquid metal to the apertures in the duct 6 so as to introduce the liquid metal into the duct 6 as the anode 4a and cathode 4b.

When the MPD generator is generating power due to the induced current 5, it is necessary to remove the current through the terminals 7a, 7b so as to use the generated power. Accordingly, it is also necessary to prevent an electrically conductive path forming in the flow of liquid metal in the electrode supplying mechanism.

To achieve this, flow electrical isolators may be used to break up the smooth flow of liquid metal, thus preventing an electrically conductive path from forming.

A flow electrical isolator to be employed may use any known technique that breaks up a liquid flow into drops that are surrounded by insulating fluid that does not react with the liquid metal. For example, an inert gas such as argon or an electrically insulating liquid such as mineral oil used in electrical transformers or electrical switchgear may be used.

Figure 12:
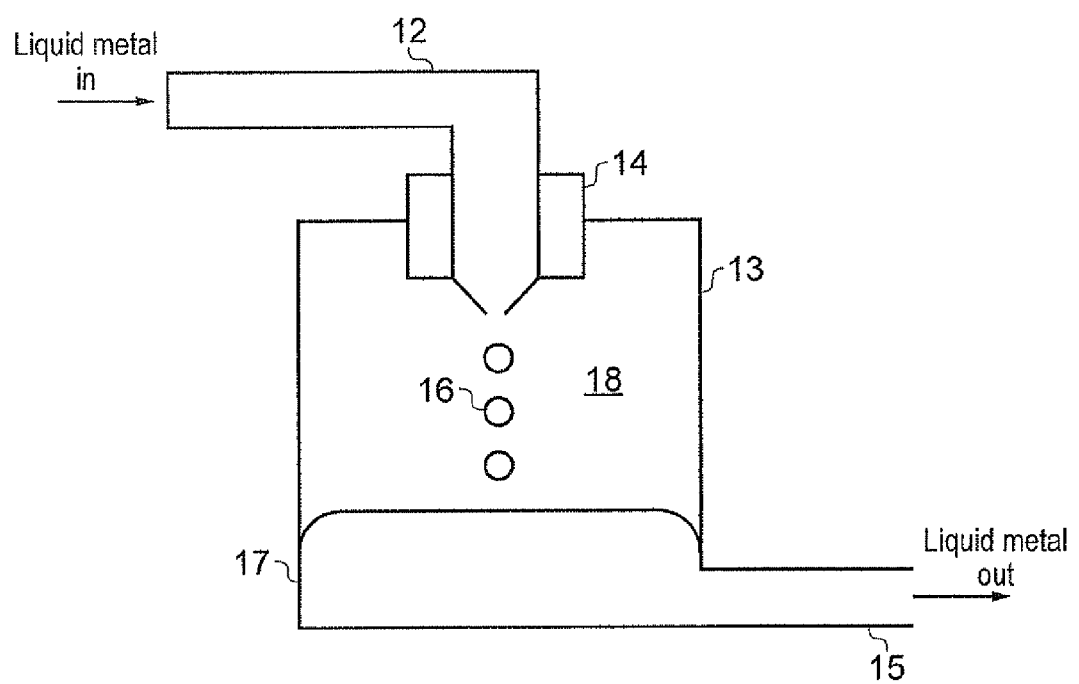
FIG. 12 shows a gravity flow electrical isolator.

FIG. 12 shows a gravity flow electrical isolator as one type of isolator which may be used. An inlet pipe 12 supplies liquid metal to a tank 13. An electrically insulating gland 14 around the pipe prevents electrical contact between the pipe 12 and the tank 13. Alternatively the tank 13 or the pipe 12 or both may be made from electrically insulating material to achieve the required electrical isolation. Further, an outlet pipe 15 is provided for distributing the liquid metal from the tank 13. Possibly the tank 13 and the outlet pipe 15 are mounted on electrical insulation to prevent an unintentional electrical contact with earth.

In use, the inlet pipe 12 and flow rate of the liquid metal are controlled by a valve or other means (not shown) so that the stream of liquid metal is broken into one or more streams of drops 16 that fall and collect in a pool 17 of liquid metal at the base of the tank 13. The tank 13 is filled with an inert gas 18 such as argon or an electrically insulating liquid 18 such as mineral oil that does not react with the liquid metal. Liquid metal is removed through the outlet pipe 15 at the base of the tank 13. The purpose of the tank 13 and the droplet stream 16 is to maintain a flow of liquid metal yet prevent a continuous electrically conductive path through the liquid metal.

However, some liquid metals, notably lithium, have a density much less than common electrically insulating oils. Lithium which has a density of 533 kg m$^{-3}$, is less dense than typical electrical insulating oils which have a density of about 850 kg m$^{-3}$ and will tend to float on the surface of such oils.

Therefore, if electrically insulating oils are required to break up a continuous electrical path in a flow of liquid lithium, an inverse gravity flow electrical isolator is required. An example inverse gravity flow electrical isolator is shown in FIG. 13.

Figure 13:
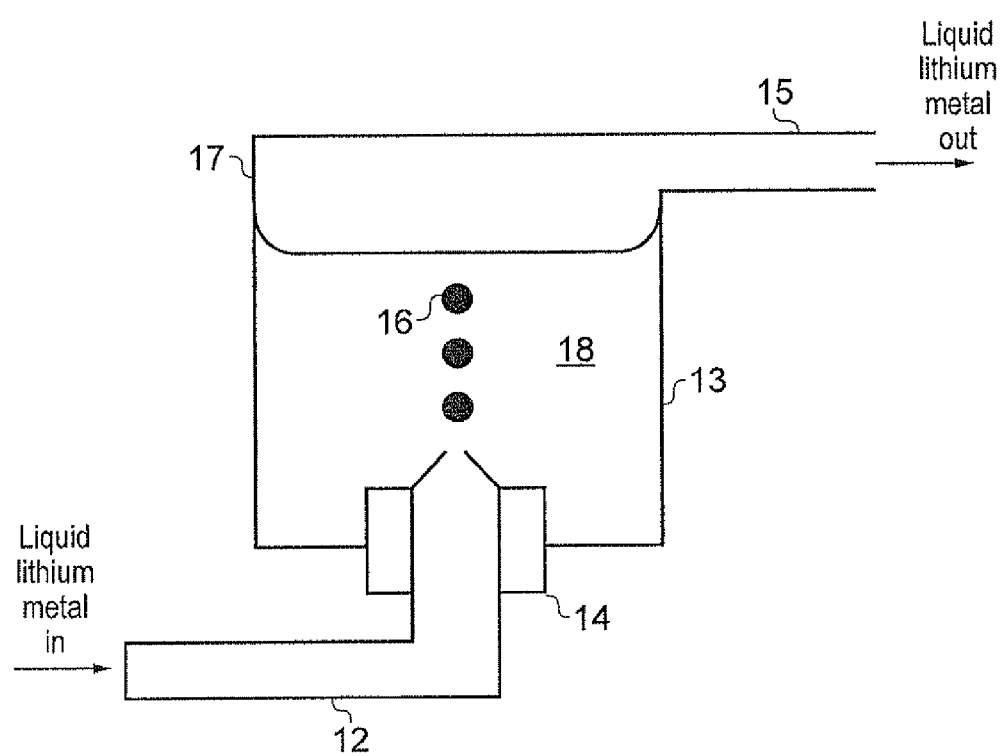
FIG. 13 shows an inverted gravity flow electrical isolator.

The flow electrical isolator of FIG. 13 is designed to use oil to break up a continuous electrical path in a flow of liquid metal that has a density less than that of the insulating oil. The structure of the isolator is in essence the same as that of FIG. 12, but with the inlet pipe 12 provided to the bottom of the tank 13 and the outlet pipe 15 provided to the top of the tank 13.

The inlet pipe 12 supplies liquid lithium metal to the tank 13. The tank is filled with an electrically insulating liquid such as mineral oil 18 that does not react with the lithium. The inlet pipe 12 and flow rate are designed so that the stream of liquid metal is broken into one or more streams of drops 16 that rise and collect in a pool 17 of liquid metal at the top of the tank 13. Liquid lithium metal is removed through the outlet pipe 15 at the top of the tank.

The purpose of the tank 13 and the droplet stream 16 is to maintain a flow of liquid lithium metal yet prevent a continuous electrically conductive path in that metal. Possibly the tank 13 and the outlet pipe 15 are made of electrically insulating material. Possibly the tank and the outlet pipe are made of metal and mounted on electrically insulating material to prevent unintentional electrical contact with earth.

Figure 14:
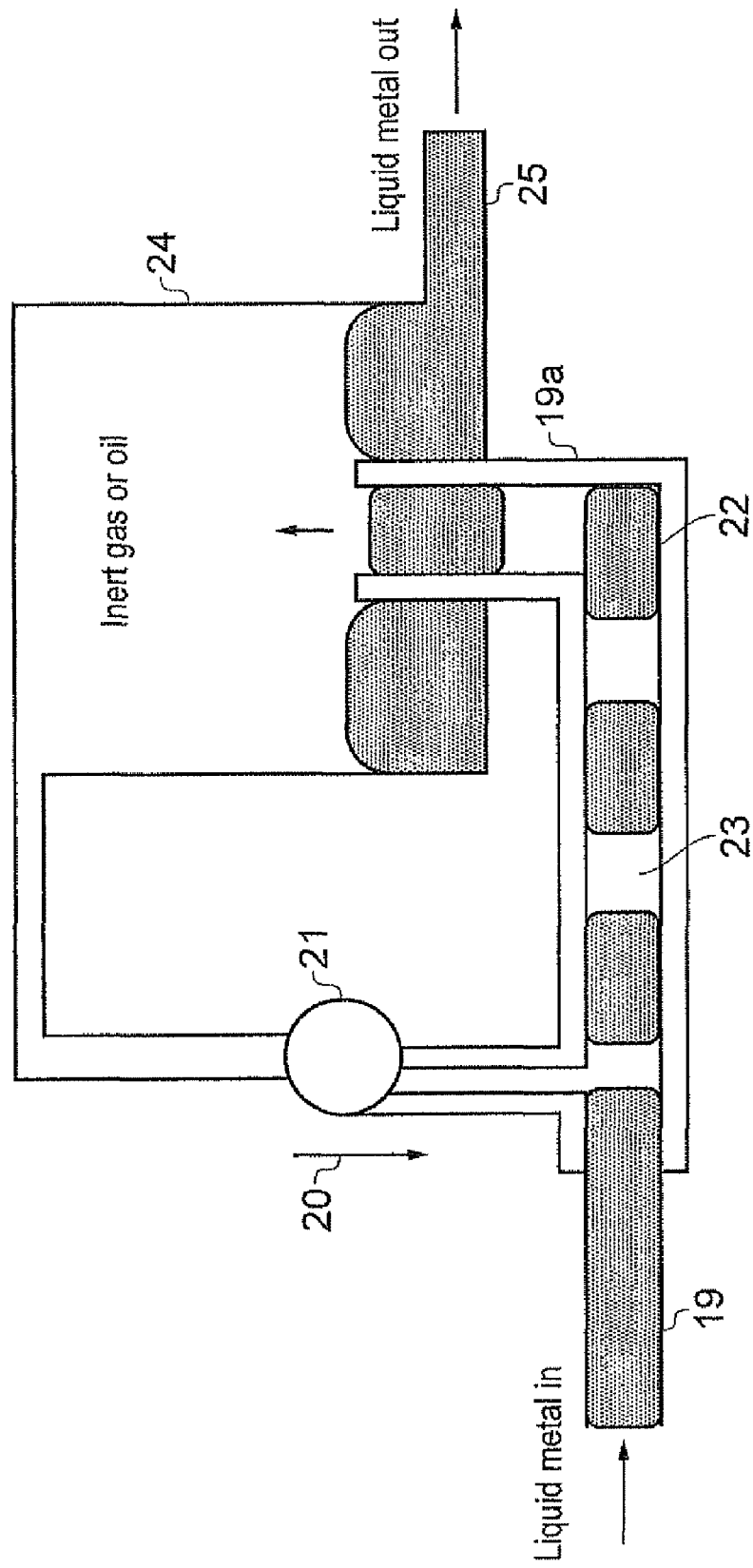
FIG. 14 shows a pumped flow electrical isolator.

FIG. 14 shows another electrical flow isolator for breaking up a continuous electrical path in a flow of liquid metal, suitable for use in the electrode supplying mechanism. This electrical flow isolator is a pumped flow electrical isolator.

The liquid metal is supplied through an inlet pipe 19 to an insulating pipe 19a made of electrically insulating material. An inert gas or electrically insulating oil 20 is pumped into the electrically insulating pipe by a pump 21 to break the liquid metal up into globules 22 that are electrically insulated from each other by the insulating pipe 19a and bubbles of gas or globules of insulating oil 23. The globules of liquid metal are sent to a tank 14 where the globules of liquid metal 22 separate from the oil or gas. The liquid metal collects at the base of the tank 24 and is drawn off through an outlet pipe 25. The oil or gas collects at the top of the tank 24 and may optionally be recycled via the pump 21 back into the electrically insulating pipe 19a.

Possibly the tank 24 and the outlet pipe 25 are made of electrically insulating material. Possibly the tank 24 and the outlet pipe 25 are made of metal and mounted on electrically insulating material.

Figure 15:
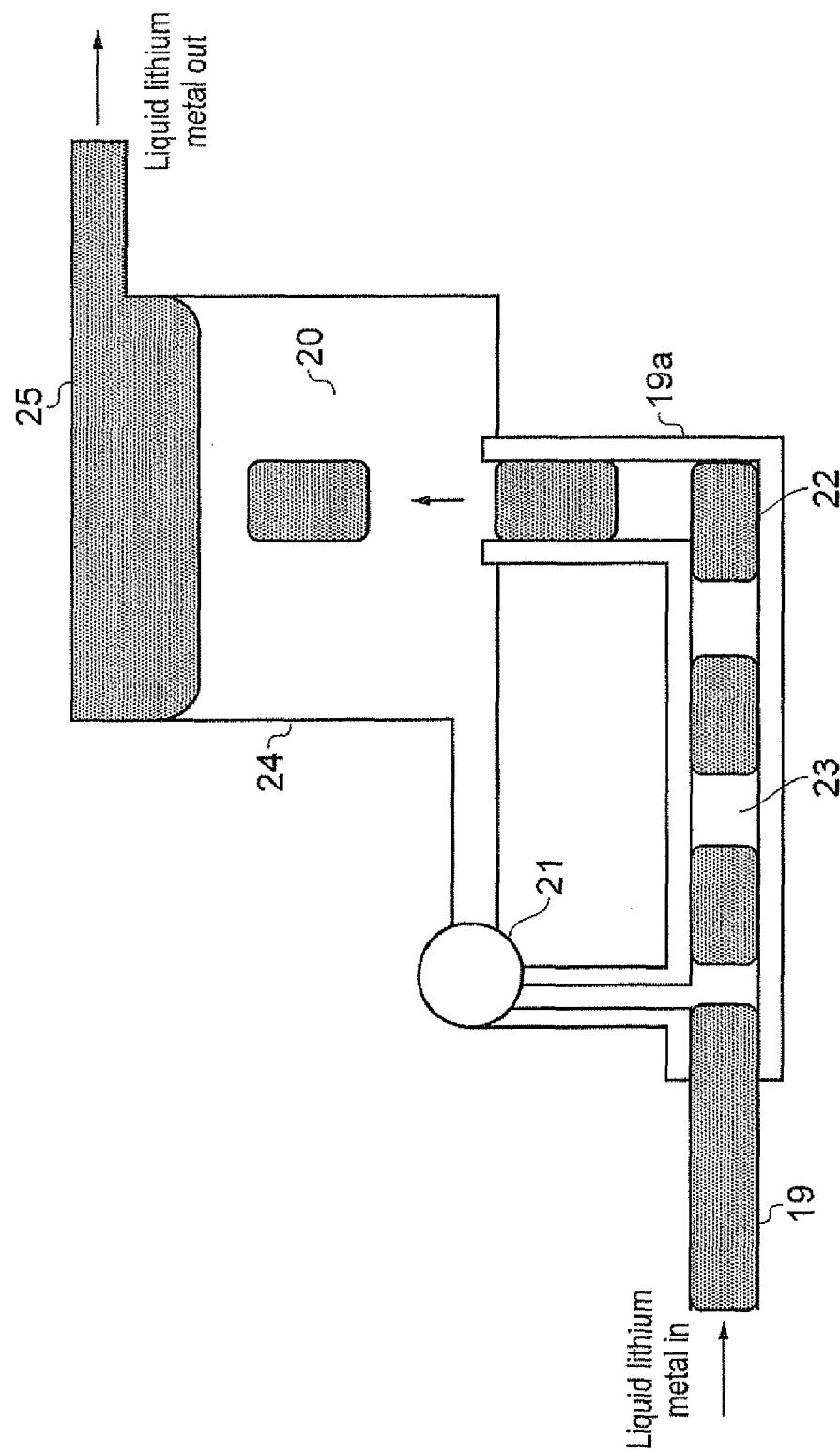
FIG. 15 shows an inverted pumped flow electrical isolator.

FIG. 15 shows still another suitable flow electrical isolator. This is an inverted pumped flow electrical isolator which may be used when electrical insulating oil is required to break up a continuous electrical path through a liquid metal, such as lithium, that is less dense than the electrically insulating oil. The structure is broadly similar to that of FIG. 14.

Liquid lithium metal is pumped along an inlet pipe 19. The liquid lithium metal enters an insulating pipe 19a where a pump 21 pumps in insulating oil 20 in order to break up the flow of liquid lithium metal into globules 22 insulated from each other by globules of insulating oil 23. The globules 22 of liquid lithium metal and globules 23 of insulating oil enter a tank 24 where the oil and liquid metal separate according to density. The liquid lithium metal floats to the top of the tank 24 where it is collected and drawn off via an outlet pipe 25. The insulation oil 20 is pumped out from the bottom of the tank 24 and recycled to separate more liquid lithium metal globules 22.

Figure 16:
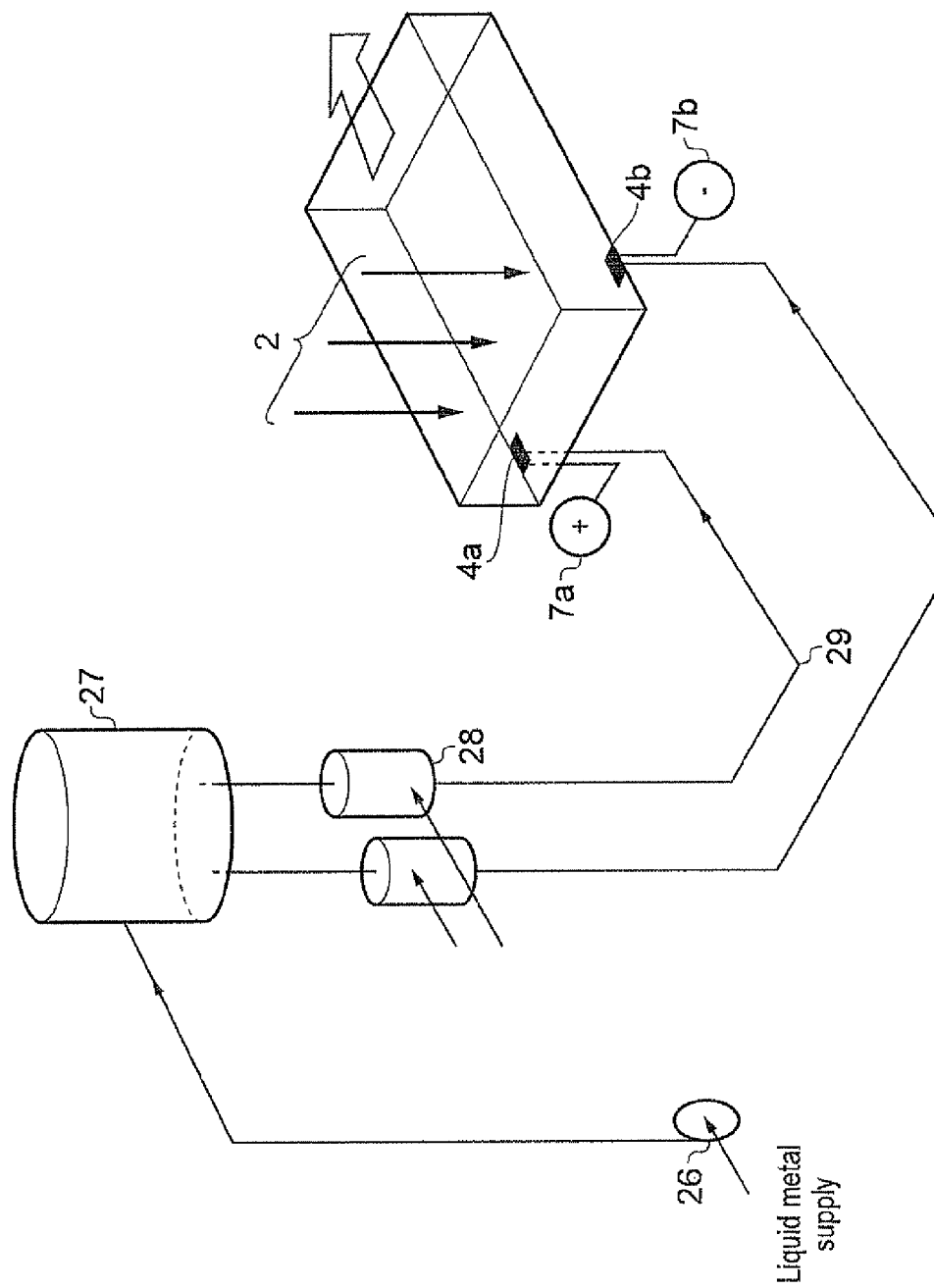
FIG. 16 is a schematic of the supply of liquid metal to the liquid metal electrodes.

FIG. 16 shows an overview of an example electrode supply mechanism for supplying liquid metal to the anode 4a and cathode 4b. A liquid metal pump 26 supplies liquid metal to a liquid metal storage tank 27 so that the liquid electrodes 4a, 4b in the MPD duct 6 may be gravity fed. The supply to each electrode 4a, 4b comes through a flow electrical isolator 28 providing electrical isolation between each electrode and earth and allows the liquid metal pump 26 and the liquid metal storage tank 27 to be earthed instead of electrically insulated from earth. Pipes 29 lead from the flow electrical isolators 28 to their respective electrodes 4a, 4b. These pipes 29 are either made from electrically insulating material or are conductive pipes that are electrically insulated from earth.

An MPD generator embodying the invention may be used in an open cycle, wherein the gas leaving the MPD generator, i.e. the exhaust gas exiting the duct 6 after passing through the magnetic field 2, is exhausted into the atmosphere and any liquid metal contained in the gas is lost.

It may be considered, however, that the liquid metal is too valuable to lose in an open-cycle design, or there may be environmental factors, such that a closed-cycle design is preferred.

Closed-cycle MPD generation is in general a known technique, and methods exist for recovering alkali metals such as potassium used to seed the gas in the MPD and improve ionisation. The seed metal is re-cycled to be used for seeding again and similar known methods of seed recovery could be employed to recover and recycle liquid metal evaporated, eroded or otherwise lost from the liquid metal electrodes.

Figure 17:
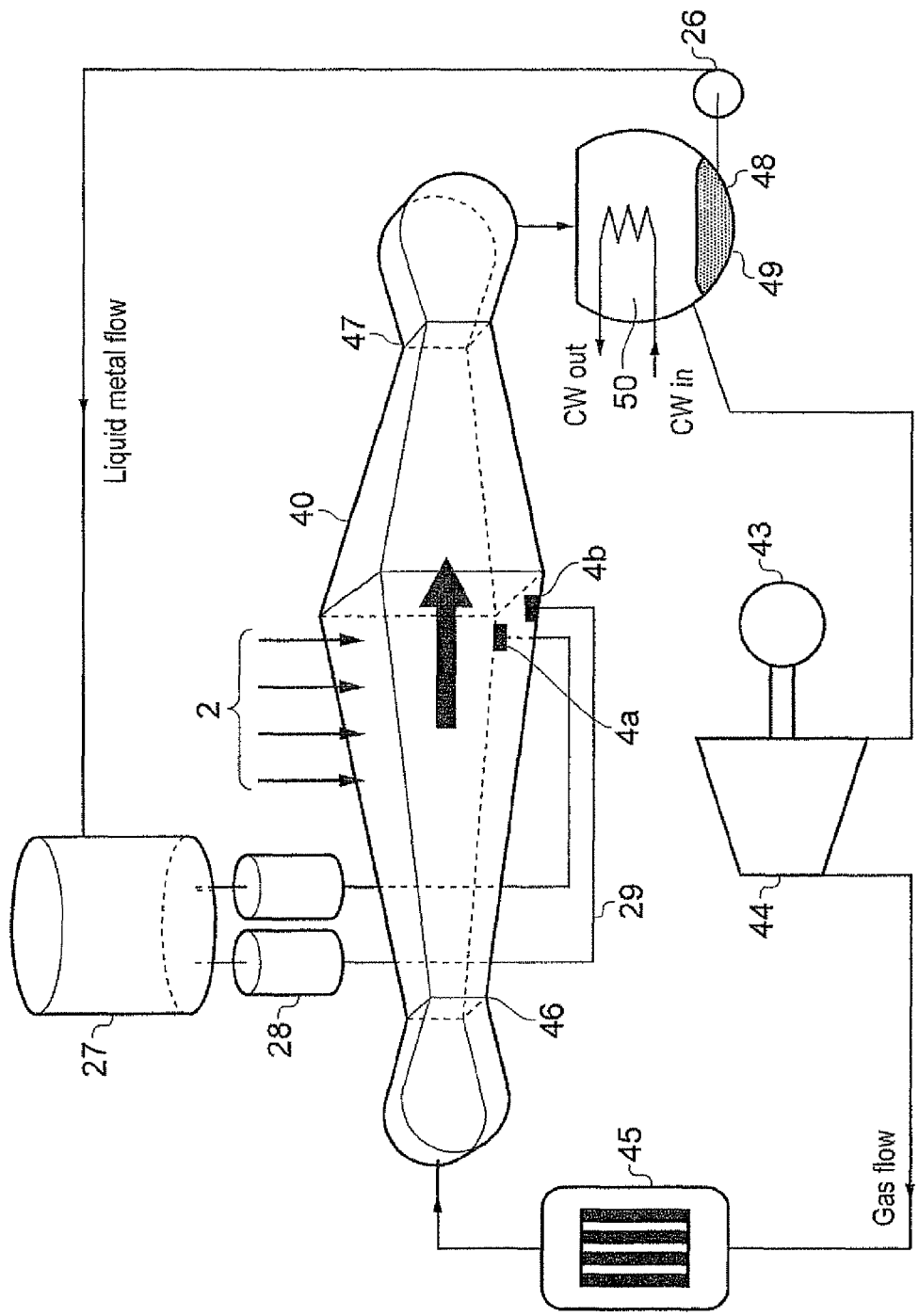
FIG. 17 shows closed cycle MPD generation.

FIG. 17 shows a liquid metal electrode MPD generator embodying the invention used in a nuclear combined cycle electricity generating system.

A motor 43 drives a compressor 44 which pumps a gas such as hydrogen or helium into a gas-cooled nuclear reactor 45 which heats the gas. A suitable reactor may be a high temperature helium-cooled generation IV reactor, but other gas cooled reactors such as advanced gas cooled reactors, which use carbon dioxide, could serve instead. One advantage of helium is that it has one of the lowest breakdown voltage of gases commonly used in nuclear reactors. The gas is expanded through a suitable nozzle 46 (e.g. con-di nozzle) to produce a fast-flowing stream of gas at low pressure. The gas passes through the exit of the nozzle and into the MPD generator 40 where there are two liquid metal electrodes, namely the anode 4a and the cathode 4b. The passage of the fast flowing gas 1 through the magnetic field 2 induces a DC MPD voltage according to Fleming's right hand rule. A DC MPD current flows between the anode 4a and cathode 4b liquid metal electrodes. The fast flowing steam of gas 1 is slowed by the energy conversion process in the MPD generation but is still flowing fast when it leaves the vicinity of the electrodes 4a, 4b. The fast flowing stream of gas 1 enters another nozzle 47 designed to slow it down so that enters a condenser-heat-exchanger 48 without an unduly high entry velocity. The condenser-heat-exchanger 48 cools the gas and also condenses any liquid metal 49 that has evaporated, eroded or otherwise has been lost as vapour from the liquid metal electrodes 4a, 4b.

The condenser-heat-exchanger 48 is provided with tubes 50 realising an inlet and an outlet for cooling water (CW) in order for the cooling water to cool the gas employed in the cycle and also condense the liquid metal. Possibly the heat exchanger 48 may be a boiler in which the gas employed in the cycle raises steam and the steam leaves the heat exchanger for various purposes such as the generation of electricity in a steam turbine.

The gas is returned to the compressor 44 and the condensed liquid metal 49 is pumped by a liquid metal pump 26 back to the MPD generator 40 via a liquid metal storage tank 27.

A pipe 29 leads from the liquid metal storage tank 27 to each electrode. A flow electrical isolator 28 is inserted in each pipe 29 to break up the electrical continuity of the flow of liquid metal to each electrode 4a, 4b. Each pipe between a flow electrical isolator 28 and an electrode 4a, 4b is either made of electrically insulating material or is electrically isolated from earth. Electrical connections are made to the liquid metal electrodes 4a, 4b to obtain the generated MPD current.

Figure 18:
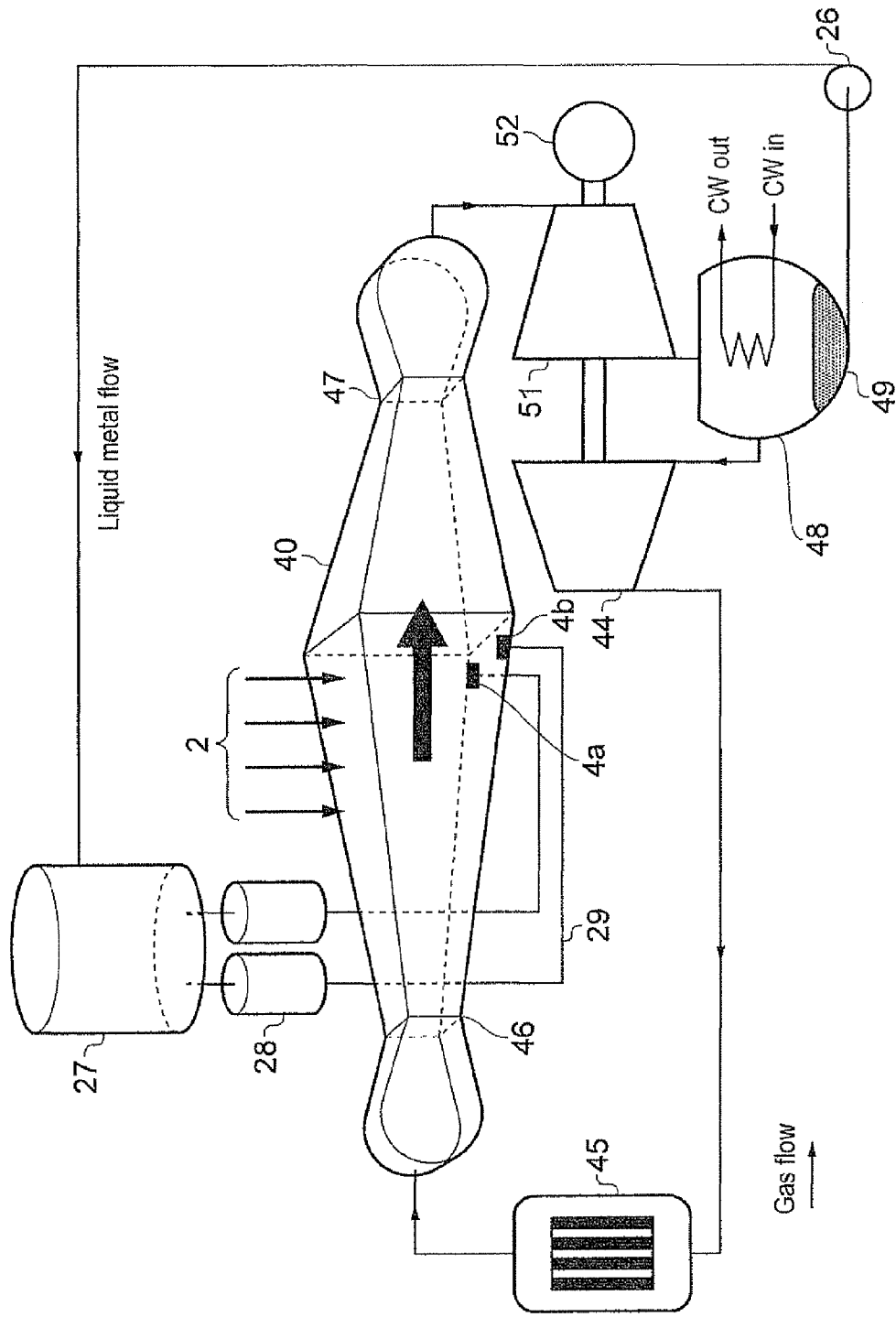
FIG. 18 shows MPD generation used in a closed gas turbine Brayton cycle.

FIG. 18 shows a variation of the closed cycle of FIG. 17, wherein the MPD generator 40 is used in a closed gas turbine Brayton cycle by using a combination of the MPD generator 40 with liquid metal electrodes 4a, 4b and a turbine compressor. The generation of electricity in the MPD generator 40 and the operation of the liquid metal electrodes 4a, 4b is similar to that previously, except that the exhaust gas and metal vapour of the MPD generator 40 are supplied to a turbine 51 which expands the exhaust gas and liquid metal vapour to generate electric power in a generator 52. The exhaust gas and liquid metal vapour is cooled in a condenser heat-exchanger 48, similarly to in FIG. 17. The cooled gas is supplied back to the compressor 44 and the condensed liquid metal is returned to the liquid metal electrodes 4a, 4b using pump 26.

Whilst FIGS. 17 and 18 show closed cycle MPD generation using hot gas produced by a nuclear reactor, the cycle could use any other suitable source such as hot gas obtained from burning various fuels, hot gas obtained from geothermal heat or hot gas obtained using concentrated sunlight.

Figure 19:
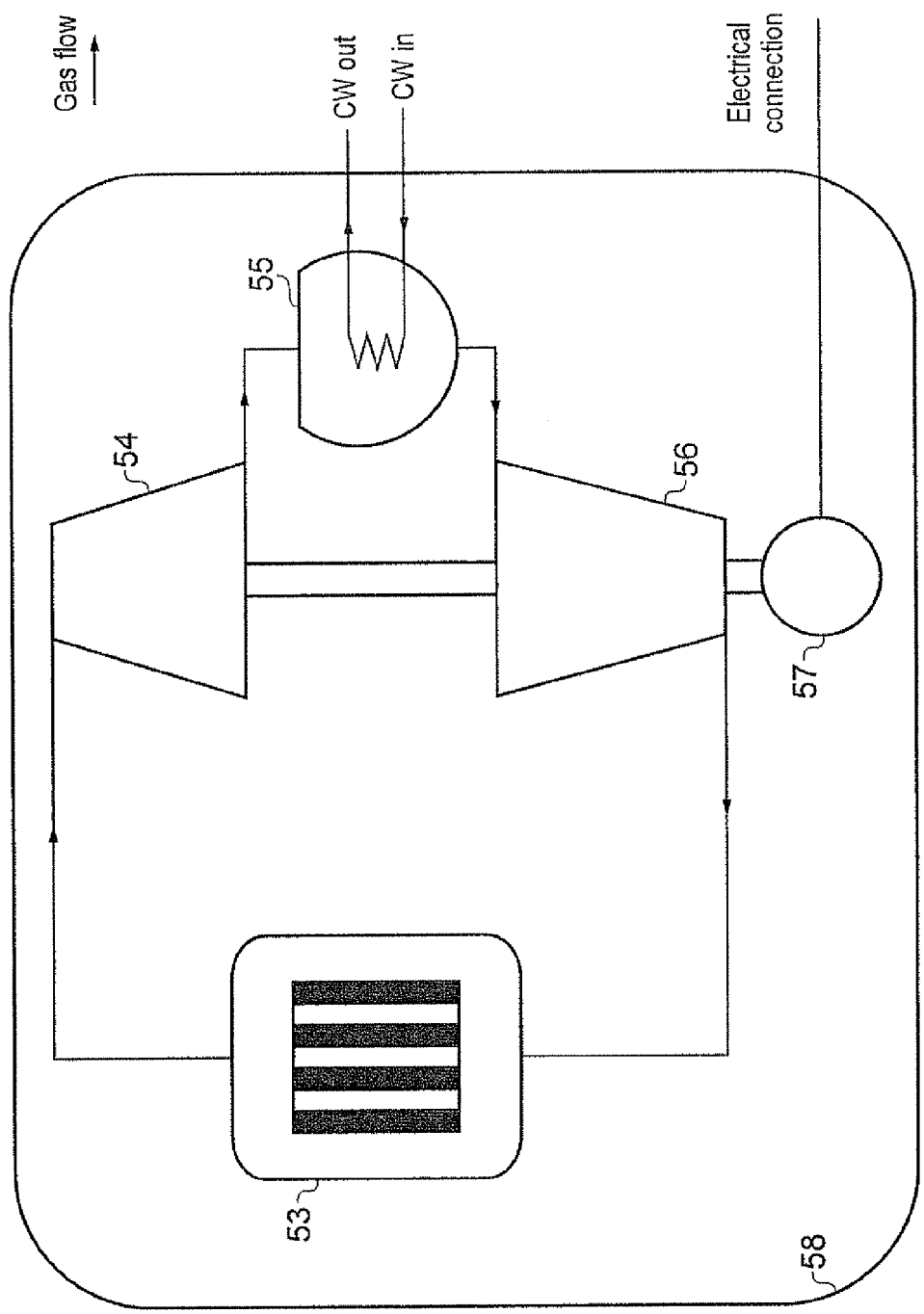
FIG. 19 shows a modular helium nuclear reactor.

FIG. 19 shows a modular helium reactor. This is a known design of nuclear reactor that has a graphite moderator and is cooled by helium. The reactor powers a helium gas turbine operating on the Brayton cycle. As shown in FIG. 19, the modular helium reactor comprises a pressure vessel 58 inside of which are provided a gas-cooled nuclear reactor 53, a turbine 54, a heat exchanger 55, a compressor 56 and an electrical generator 57.

The electricity generation is started by supplying the electrical generator 57 with electrical energy so that it acts as an electric motor, operating the compressor 56 which compresses helium gas to supply the nuclear reactor 53. The nuclear reactor 53 heats the helium gas and this gas is expanded through the turbine 54 to develop mechanical power. The turbine is coupled to the compressor 56 so that some of the mechanical power developed by the turbine 54 drives the compressor 56. The remaining power generates electrical power in the electrical generator 57. After expansion through the turbine 54 the helium gas is cooled in the heat exchanger 55 supplied with cooling water (CW).

The pressure vessel 58 prevents any leak of radioactivity. Penetrations of the pressure vessel are kept to a minimum to reduce costs and improve reliability. The only penetrations are the cooling water inlet and outlet, the electrical connection to the generator, and instrumentation leads (not shown). In some designs of nuclear reactor, the pressure vessel 58 is intended to be sealed for a design life of 60 years and so reliability is essential.

One problem is that the exit temperature of the reactor 53 and therefore the efficiency of generation is limited by the turbine entry temperature which in turn is set by the materials used in the turbine 54, in particular the first few rows of turbine blades.

An MPD generator offers a solution since MPD generation is not so limited by temperature. The use of liquid metal electrodes 4a, 4b overcomes the problems of electrode erosion that plagues many designs of MPD generator, including those proposed for nuclear generation.

Figure 20:
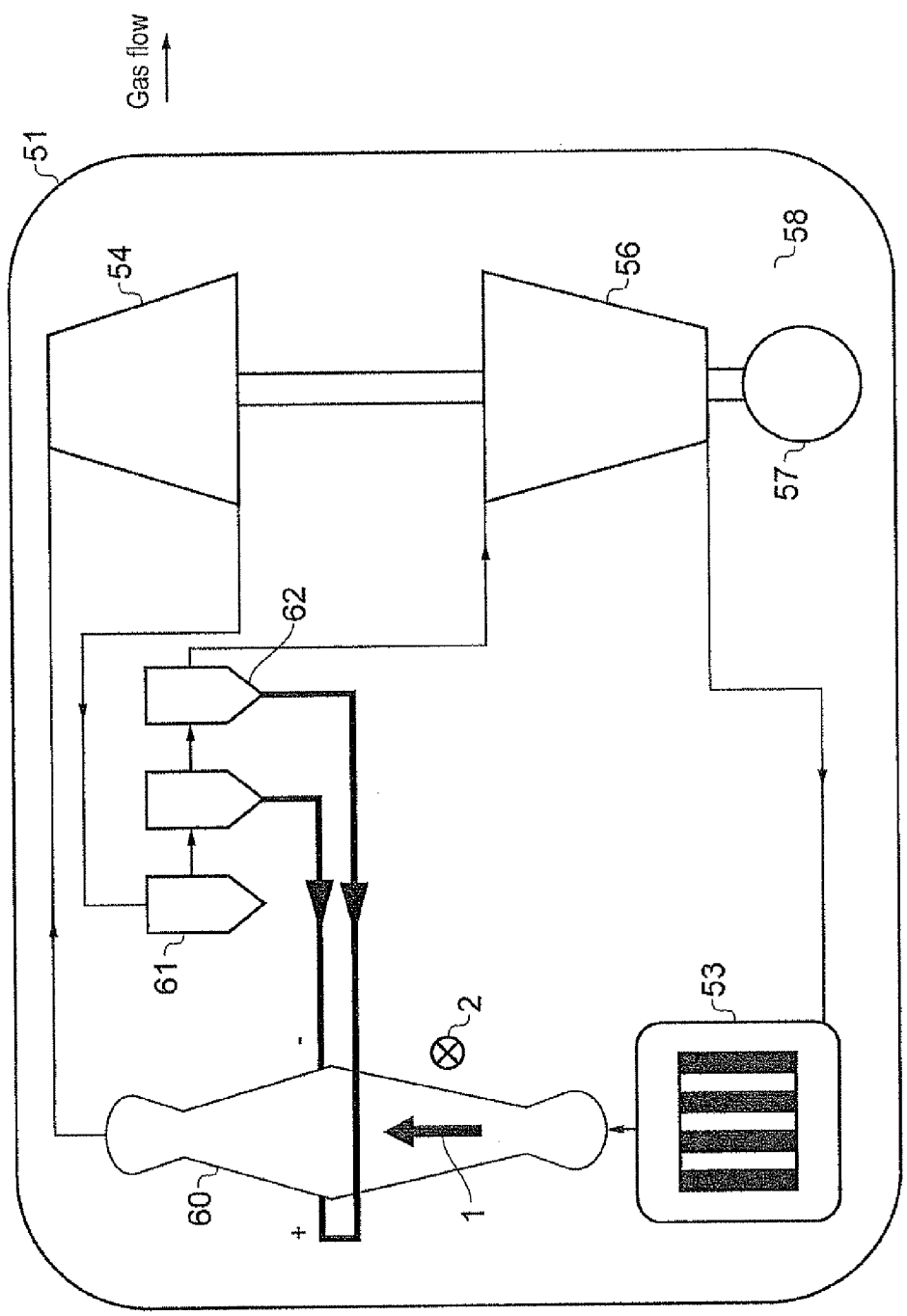
FIG. 20 shows the modular helium reactor using MPD generation.

FIG. 20 shows a modular helium reactor 51 using an MPD generator 60. The operation of the modular helium reactor is similar to that illustrated in FIG. 19 except that the MPD generator 60 is provided between the outlet of the nuclear reactor 53 and the inlet of the turbine 54. An important feature of the MPD generator 60 is that liquid metal lost from the electrodes 4a, 4b is condensed in electrode condenser heat exchangers 62 which are at a higher level than the MPD generator 60 allowing a gravity feed of the liquid metal to the MPD generator. This avoids the need for pumps.

Figure 21:
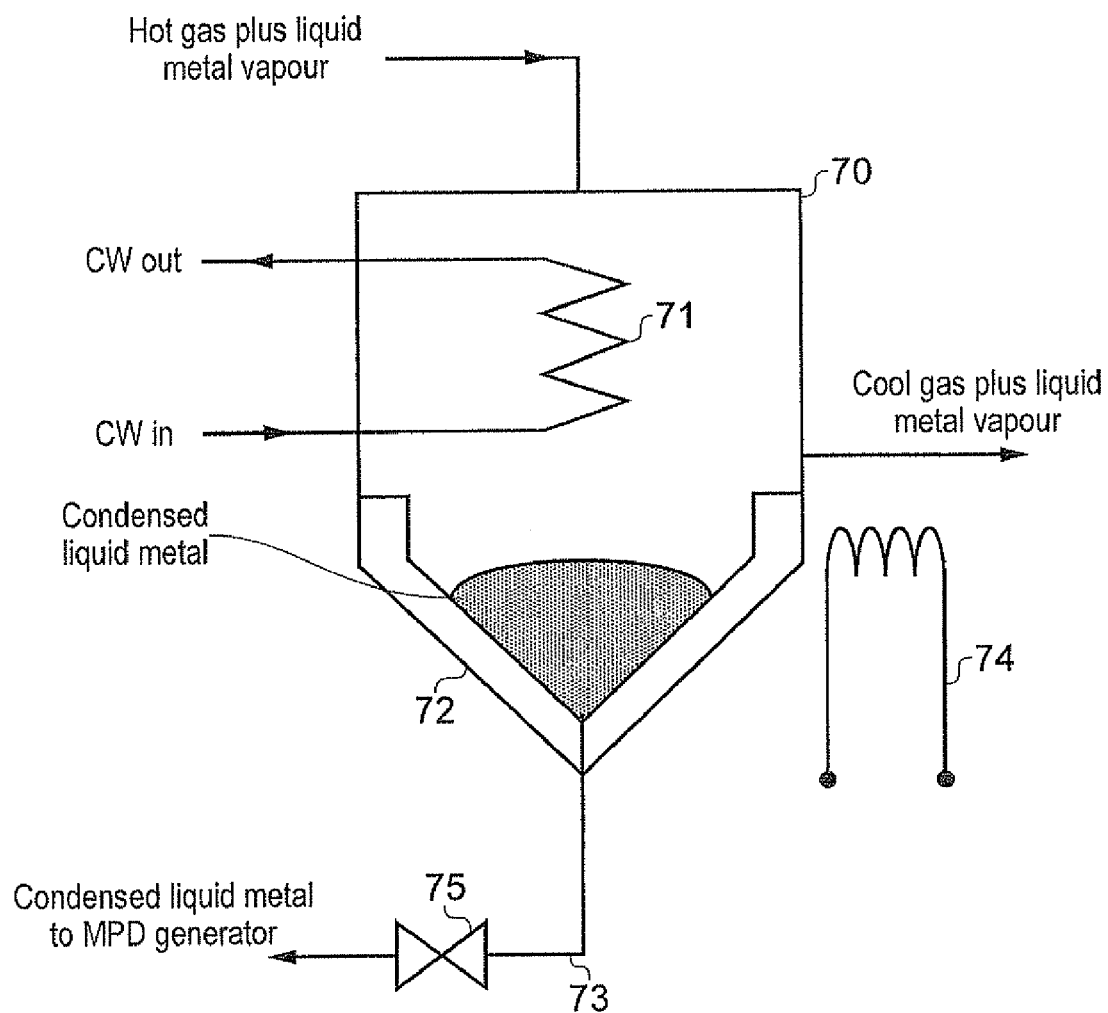
FIG. 21 shows an electrode condenser heat exchanger used in the configuration of FIG. 20.

FIG. 21 shows in more detail the design of condenser heat-exchangers 62 which cool a supply of gas and metal vapour and consequently provide a supply of liquid metal to liquid metal electrodes 4a, 4b in the MPD generator 60 and also cools the gas.

The electrode condenser heat exchanger 62 is a tank 70 which contains one or more tubes 71 through which a coolant such as cooling water (CW) flows. This cools the flow of gas and metal vapour so that the metal vapour condenses on the tubes and then falls to the base 72 of the tank. The base 72 of the tank 70 is made from electrically insulating material shaped so that the liquid metal collects in a region in which an outlet pipe 73 is provided to supply liquid metal to liquid metal electrodes 4a, 4b in the MPD generator. The supply of liquid metal is isolated from earth because the outlet pipe 73 is either made from electrically insulating material or is made of metal and insulated from earth.

It is important that the level of liquid metal does not fall so that the tank 70 runs dry or that the level of liquid metal rises and overflows the electrically insulated part of the tank and makes contact with earthed metal. The electrode condenser heat exchanger 62 is provided with one or more level detectors 74 to measure the level of the liquid metal in the tank. An example of a suitable level detector is an inductive level detector comprising an electrical coil whose AC electrical impedance is measured by a suitable device (not shown). The electrical coil is placed close to the insulated base 72 of the tank 70 and the electrical impedance of the coil varies according to the level of liquid metal in the tank. This method of measurement avoids any electrical contact with the liquid metal and preserves an unearthed supply of liquid metal. The level of liquid metal in the tank 70 may be controlled by a suitable valve 75 in the outlet pipe, or by varying the flow of gas and metal vapour into the electrode condenser heat exchanger 62, or by varying the temperature and flow rate of the coolant. The latter two control the level of liquid metal by varying the rate of condensation of the liquid metal.

Figure 22:
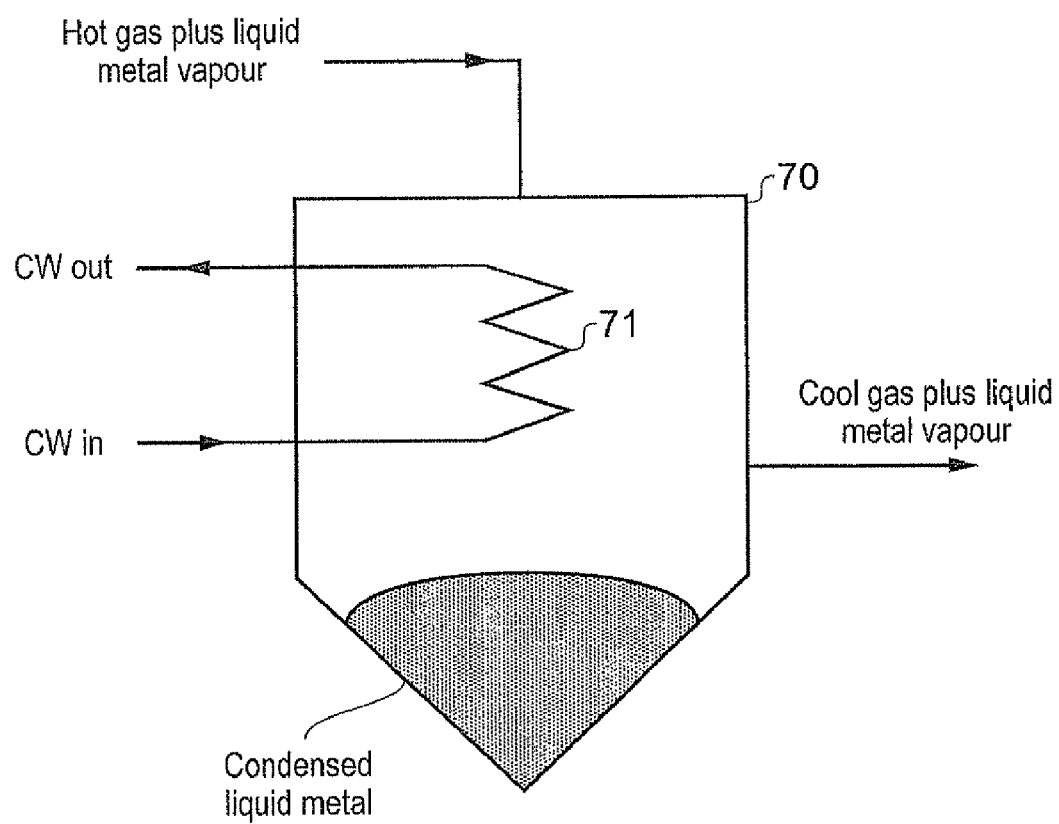
FIG. 22 shows a liquid metal reservoir used in the configuration of FIG. 20.

If a reservoir of liquid metal is required, this may be provided by the arrangement of FIG. 22. Liquid metal is supplied to the reservoir by condensation of metal vapour on the heat exchanger coil 71. Since this liquid metal is a reservoir and will not be supplying either electrode 4a, 4b directly, the reservoir need not be of earthed construction and the tank 70 may be made wholly of metal.

Normally the level of liquid metal in the reservoir would be kept constant by keeping the temperature of the heat exchanger coil 71 just above the dew-point of the metal vapour so that no metal vapour condenses and no liquid metal evaporates from the pool of condensed liquid metal at the base of the tank. If liquid metal is to be abstracted from the MPD generator system, the temperature of the cooling water is reduced or its flow rate is increased so that the temperature of the heat exchanger coil 71 falls, condensing liquid metal.

If liquid metal is to be supplied to the MPD generator system the temperature of the cooling water is raised or its flow rate is reduced so that the temperature of the heat exchanger coil 71 rises. Not only does this stop the condensation of liquid metal but it also raises the temperature of the gas passing over the condensed liquid metal, evaporating metal. Possibly the condensed liquid metal may be heated or cooled by external means (not shown).

Figure 23:
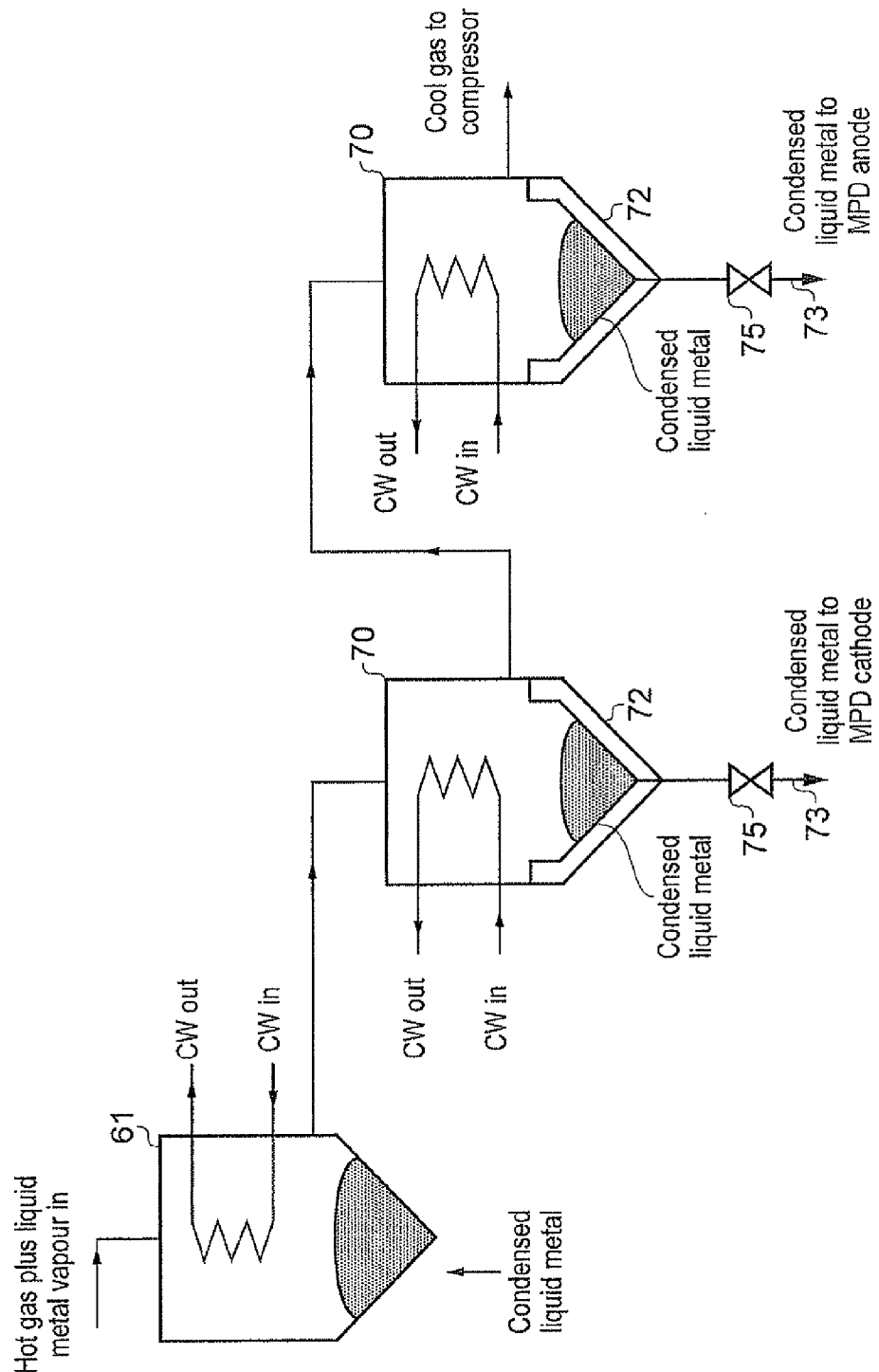
FIG. 23 shows an arrangement using the heat exchanger of FIG. 21 and the reservoir of FIG. 22.

FIG. 23 shows the arrangement of the reservoir 80 of liquid metal and the electrode condenser heat exchangers 62. One electrode condenser heat exchanger 62 is provided for each electrode 4a, 4b not only for electrical isolation between the electrodes but also so that each electrode may be supplied with liquid metal individually at a flow rate suited to that electrode. The required flow rate will depend upon the polarities of the electrodes as follows:

Experience with electrical discharges through plasmas has shown that most of the electric current is carried by electrons rather than ions since the former are lighter and therefore more mobile. It is therefore expected that most of the MPD current will be carried by electrons also. Electrons will be emitted thermionically by the anode and will travel to the cathode under the influence of the MPD voltage. The thermionic emission of electrons from the anode will cool the anode reducing the erosion of that electrode (an effect observed with carbon arc lamps). Therefore, the flow of liquid metal to the cathode will need to be greater than that to the anode since the cathode will not enjoy thermionic cooling.

The operation of the liquid metal reservoir 80 and the electrode condenser heat exchangers 62 is described as follows:

The hot gas and metal vapour enters the liquid metal reservoir 80. The temperature and flow rate of the cooling water is adjusted to vary the evaporation of condensation of liquid metal to keep the required amount of liquid metal in the reservoir 80.

The gas and liquid metal vapour leaves the liquid metal reservoir 80 and enters the cathode electrode condenser heat exchanger 62 where the heat exchanger coil cools the gas and metal vapour, condensing liquid metal and supplying it to the cathode 4b. A similar process takes place in the anode condenser heat exchanger 62. The cool gas leaves the anode condenser heat exchanger and returns to the compressor.

The cathode electrode condenser heat exchanger (rather than the anode electrode condenser heat exchanger) is placed immediately after the liquid metal reservoir so that the cathode electrode condenser heat exchanger enjoys the benefit of a gas stream with a large concentration of metal vapour. This helps fulfil the requirement for the flow rate of the liquid metal to the cathode 4b to be faster than to the anode 4a.

In the above embodiments, with reference to FIGS. 2 to 23, the supply of a liquid metal by the electrode supplying mechanism for use as liquid metal electrodes has been described. As an alternative in each of these embodiments, the electrode supplying mechanism may supply a molten salt for use as liquid electrodes.

Figure 24:
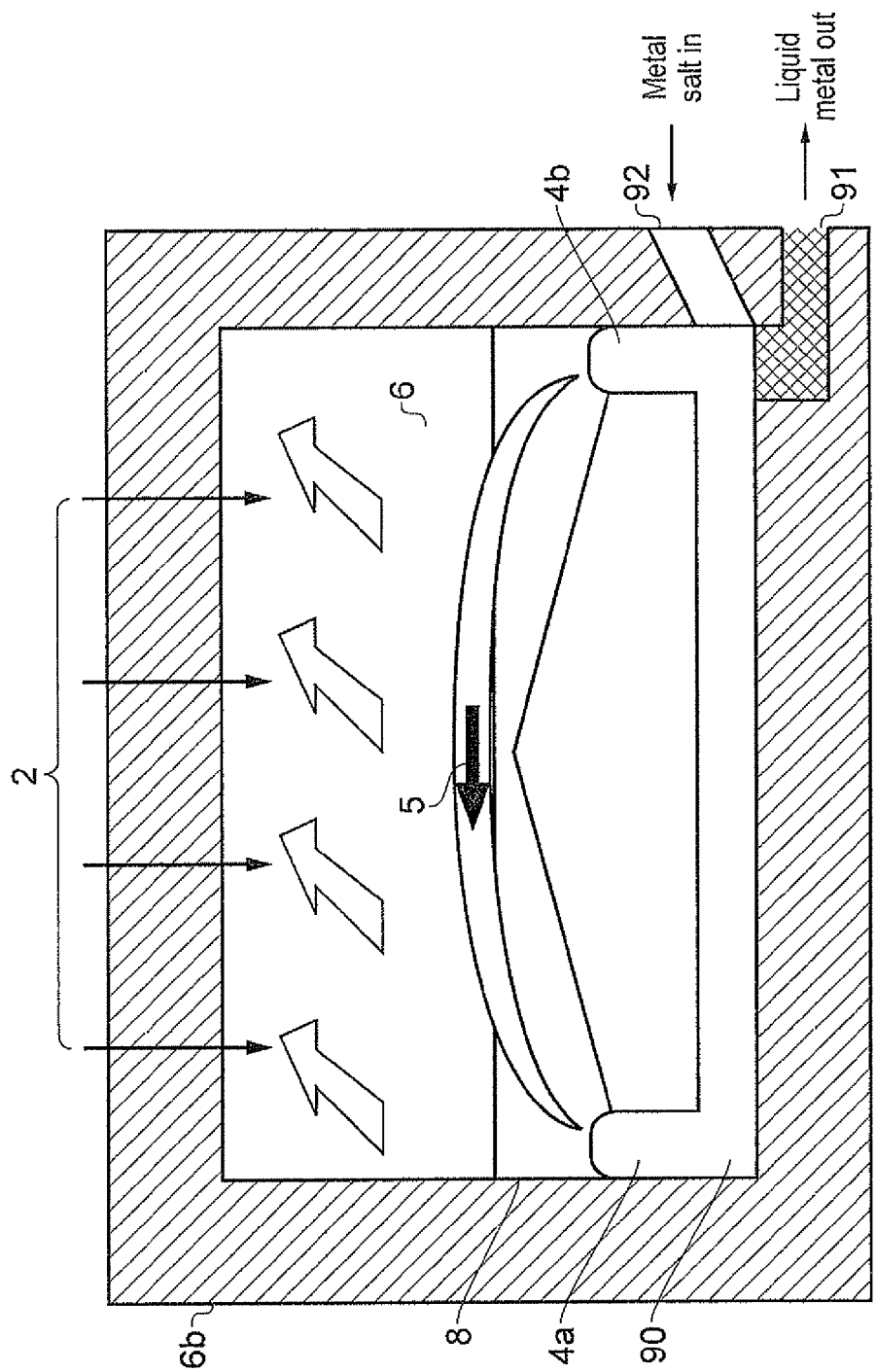
FIG. 24 shows a variant MPD duct structure for use in smelting.

FIG. 24 shows a variant MPD duct structure for use in smelting. The basic structure is the same as that shown in FIG. 2, except that a tube 90 is provided to connect the anode 4a and the cathode 4b and a liquid metal outlet 91 is provided in the vicinity of the cathode 4b. Terminal connections 7a, 7b are not provided.

In FIG. 24, the electrical energy generated in the MPD generator is used to obtain metal from a fused salt by electrolysis. A metal salt is melted by an external heat source (not shown) to form part of an electric circuit. Two electrodes 4a, 4b are formed, one on each side of the MPD duct 6 and are linked to each other by the tube 90 of molten salt. An MPD current 5 flows between the electrodes, liberating metal at the cathode 4b. The metal liberated at the cathode 4b falls to the bottom of the tube 90 of molten salt and is drawn off via the liquid metal outlet 91. Metal salt is supplied via an inlet 92 of the electrode supplying mechanism placed just above the liquid metal outlet 91. The close proximity of the metal salt inlet 92 and liquid metal outlet 91 reduces the voltage between the inlet and outlet. This reduces the voltage difference between the supply mechanism (not shown) which supplies the metal salt, and the apparatus (not shown) which handles the liquid metal and allows both to be earthed without undue flow of DC current between them.

The refining of aluminium would be a suitable candidate for MPD smelting. Aluminium is usually refined in the Hall-Heroult process which smelts aluminium using fused salt electrolysis and carbon anodes. One major cost is the replacement of carbon anodes which are eroded by the oxygen liberated in the process.

MPD smelting using fused salt electrolysis would offer savings by avoiding the need for carbon anodes. Instead, metal is liberated where the MPD current touches the molten salt cathode 4b.

Further, MPD smelting could be used as part of a combustion electricity generating plant. A fuel would be burned to produce a fast-flowing stream of gas 1 in the MPD duct 6 in order to produce an MPD current 5 for the smelting process. The exhaust gases leaving the MPD duct 6 would still be hot enough to raise steam in a boiler to drive an electricity generating turbine. Possibly the fast flowing stream of gas could be generated by nuclear means as described with reference to FIGS. 19 and 20.

The MPD current 5 could be established by varying the level of metal salt in the channel 8 in a similar way to the method described in FIGS. 5 to 8.

In a further embodiment, the electrode supply mechanism is arranged to convert inputted liquid metal into solid metal electrodes. This has the advantage that the location and deployment of the electrodes can be made more versatile than in the case of using liquid electrodes, in which case the location and deployment may be restricted to avoid leakage of the liquid metal electrodes.

Figure 25:
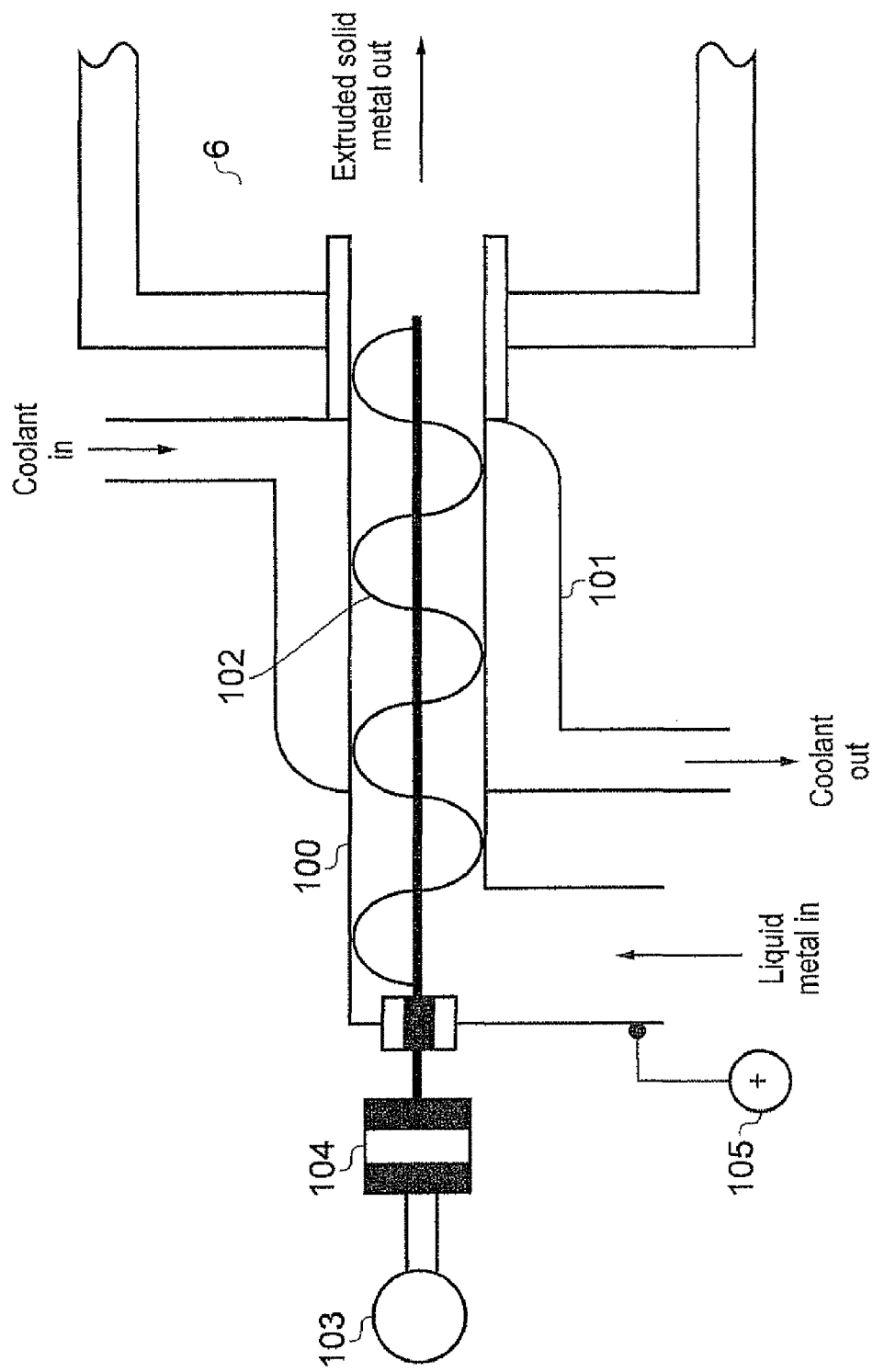
FIG. 25 shows an example electrode supplying mechanism for supplying liquid metal for use as a solid electrode.

FIG. 25 shows an electrode supply mechanism for supplying solid metal electrodes into the duct 6 from a supply of liquid metal. The electrode supply mechanism includes a metal extrusion pipe 100, a cooling jacket 101, an extrusion screw 102, a motor 103, an electrically insulated coupling 104 and an electrical terminal 105.

The liquid metal supplied to the metal extrusion pipe 100 is cooled by the coolant in the cooling jacket 101 and extruded using the extrusion screw 102, driven by the motor 103, so as to introduce a solid extruded metal electrode into the duct 6.

The extrusion technique is similar to that used to extrude sectored solid aluminium conductor for electric cables. In fact, the extrusion of solid alkali metals such as sodium, lithium and potassium would normally be easier than aluminium since all three alkali metals are more ductile.

Care must be taken with the extrusion method to avoid any unintentional electrical contact with earth. This may require parts of the extrusion apparatus to be made of electrically insulating material or to be mounted on electrically insulating material. Power supplies to the extrusion process should be electrically isolated, as should the motor 103 as shown using the insulated coupling 104.

In use, the liquid metal is supplied from a flow electrical isolator (e.g. as described earlier) so that the liquid metal is electrically isolated from earth. The metal extrusion pipe 100 contains the liquid metal and the extrusion screw 102. Both are insulated from earth. The electrical connection through terminal 105 is made to the metal extrusion pipe 100 in order to make an electrical connection to the extruded metal electrode 4a, 4b.

The metal extrusion pipe 100 is cooled so that the liquid metal solidifies along the metal extrusion pipe so that the electrode can be extruded. As shown, an electrically insulating coolant fluid, such as air, is passed through the cooling jacket 101 surrounding the metal extrusion pipe 100, though it may in some instances be possible to use natural cooling. A heat exchanger (not shown) could be used to recover heat from the electrically insulating cooling fluid and the heat used for various purposes. In any case, the method of cooling has to prevent electrical contact between the metal extrusion pipe 100 and earth, for example via the cooling jacket 101. The cooling jacket 101 therefore has to be made from electrically insulating material or metal isolated form earth.

The extrusion screw 102 is driven by the motor 103 using the electrically insulating coupling 104 to prevent the extrusion screw 102 and therefore the liquid metal making unintentional electrical contact with earth.

The invention claimed is:

1. A magnetoplasmadynamic (MPD) generator comprising:
    a conveying duct shaped for conveying a high velocity conductive fluid;
    a magnetic field generator arranged to generate a magnetic field across the conveying duct, substantially perpendicular to a direction of travel of the high velocity conductive fluid, such that the high velocity conductive fluid passes through the magnetic field when conveyed by the conveying duct;
    electrodes provided in the conveying duct to conduct a current induced in the high velocity conductive fluid as the high velocity conductive fluid is conveyed by the conveying duct through the magnetic field; and
    an electrode supplying mechanism configured to supply a liquid metal or molten salt for use as the electrodes, wherein
      the electrode supplying mechanism includes a pumping means for varying a height of the liquid metal or molten salt electrodes in the conveying duct,
      the conveying duct comprises a channel provided in a lower region of the conveying duct,
      the liquid metal electrodes or molten salt electrodes are arranged in wells at a bottom of the channel, and
      the channel has a sloping base region between the liquid metal or molten salt electrodes.

2. An MPD generator as claimed in claim 1, further comprising a repelling device for generating a magnetic field that repels the induced current in the high velocity conductive fluid away from an inner surface of the conveying duct.

3. An MPD generator as claimed in claim 2, wherein the repelling device is a repelling circuit arranged to have a current flowing in an opposite direction to a flow of the induced current in the high velocity conductive fluid, so as to repel the induced current away from the inner surface of the conveying duct.

4. An MPD generator as claimed in claim 3, wherein the repelling device is arranged beneath the sloping base region of the conveying duct.

5. An MPD generator as claimed in claim 4, wherein the repelling circuit comprises
    a first variable impedance connected to an anode electrode and a positive terminal,
    a first conductor arranged beneath the sloping base region of the conveying duct, the first conductor being connected to the anode electrode and being connected to the positive terminal via a second variable impedance,
    a third variable impedance connected to a cathode electrode and a negative terminal, and
    a second conductor arranged beneath the sloping base of the conveying duct, the second conductor being connected to the cathode electrode and being connected to the negative terminal via one of the first variable impedance, the second variable impedance and the third variable impedance.

6. An MPD generator as claimed in claim 1, wherein an anode and a cathode are provided as the electrodes, a conduit is provided to link the anode and the cathode, and a liquid metal outlet is provided from the conduit in the vicinity of the cathode.

7. The use of an MPD generator as claimed in claim 6, for metal smelting by supplying a molten metal salt as the anode and the cathode, using the electrode supplying mechanism.

8. An MPD generator as claimed in claim 1, further comprising:
- a condenser arranged to receive the high velocity conductive fluid from the conveying duct after it has passed through the magnetic field so as to condense any liquid metal or molten salt contained in an exhaust gas.

9. An electricity generating system comprising:
- an MPD generator as claimed in claim 8; and
- an electricity generator which generates hot gas, wherein the MPD generator and the electricity generator are arranged to operate in a closed cycle.

10. An electricity generating system as claimed in claim 9, wherein the electricity generator is selected from the group comprising a gas cooled nuclear reactor, a geothermal generator and a solar generator.

11. A method of starting the MPD generator as claimed in claim 1, the method comprising:
- using the pumping means to adjust the height of the liquid metal or molten salt in the conveying duct so that the liquid electrodes touch;
- passing a large starting current between the electrodes;
- reducing the height of the liquid metal or molten salt so as to separate the electrodes; and
- initiating the magnetic field and the flow of the high velocity conductive fluid through the conveying duct.

12. A magnetoplasmadynamic (MPD) generator comprising:
- a conveying duct shaped for conveying a high velocity conductive fluid;
- a magnetic field generator arranged to generate a magnetic field across the conveying duct, substantially perpendicular to a direction of travel of the high velocity conductive fluid, such that the high velocity conductive fluid passes through the magnetic field when conveyed by the conveying duct;
- electrodes provided in the conveying duct to conduct a current induced in the high velocity conductive fluid as the high velocity conductive fluid is conveyed by the conveying duct through the magnetic field; and
- an electrode supplying mechanism configured to supply a liquid metal or molten salt for use as the electrodes, wherein
    - the electrode supplying mechanism includes a pumping means for varying a height of the liquid metal or molten salt electrodes in the conveying duct, and
    - the electrode supplying mechanism includes a flow electrical isolator configured to prevent an electrically conductive path forming in the flow of liquid metal or molten salt for use as the liquid metal electrodes.

13. An MPD generator as claimed in claim 12, wherein the flow electrical isolator is a gravity flow or inverse gravity flow electrical isolator arranged to break up the flow of liquid metal or molten salt into drops that pass through an electrically insulating fluid.

14. An MPD generator as claimed in claim 12, wherein the flow electrical isolator is a pumped flow or inverted pumped flow electrical isolator including an electrically insulating conduit and a pump operable to pump an electrically insulating fluid into a conduit to separate the liquid metal or molten salt into mutually insulated globules.

* * * * *